US012720548B2

(12) United States Patent
Raghavan et al.

(10) Patent No.: US 12,720,548 B2
(45) Date of Patent: Aug. 25, 2026

(54) SELECTING ANTENNA ELEMENTS WITH AN L SHAPED ANTENNA MODULE

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Sinan Adibelli, San Diego, CA (US); Junyi Li, Fairless Hills, PA (US)

(73) Assignee: QUALCOMM Incorproated, San Diego, CA (US)

( * ) Notice: Subject to any disclaimer, the term of this patent is extended or adjusted under 35 U.S.C. 154(b) by 313 days.

(21) Appl. No.: 18/467,321

(22) Filed: Sep. 14, 2023

(65) Prior Publication Data

US 2024/0098743 A1 Mar. 21, 2024

Related U.S. Application Data

(60) Provisional application No. 63/381,737, filed on Oct. 31, 2022, provisional application No. 63/259,922, filed on Sep. 15, 2022.

(51) Int. Cl.
*H04W 72/20* (2023.01)
*H04W 72/50* (2023.01)

(52) U.S. Cl.
CPC ........... *H04W 72/20* (2023.01); *H04W 72/50* (2023.01)

(58) Field of Classification Search
CPC .. H04W 72/20; H04W 72/50; H04B 7/06952; H04B 7/0404; H04B 7/04; H04B 7/05; H04B 7/10; H04B 7/0691; H01Q 21/30
See application file for complete search history.

(56) References Cited

U.S. PATENT DOCUMENTS

| | | | | |
|---|---|---|---|---|
| 11,245,203 B2 * | 2/2022 | Semonov | ................. | H01Q 1/42 |
| 2012/0021693 A1 * | 1/2012 | Wintzell | ............... | H04W 24/10 455/67.11 |
| 2017/0062952 A1 * | 3/2017 | Sundararajan | ......... | H01Q 1/246 |
| 2018/0063693 A1 * | 3/2018 | Chakraborty | ......... | H04W 8/005 |
| 2019/0089441 A1 * | 3/2019 | Sivahumaran | ....... | H04B 7/0626 |
| 2022/0263564 A1 * | 8/2022 | Lee | ...................... | H04B 7/0814 |

OTHER PUBLICATIONS

International Search Report and Written Opinion—PCT/US2023/074303—ISA/EPO—Jan. 9, 2024 (2203902WO).

* cited by examiner

*Primary Examiner* — Mohamed A Kamara
(74) *Attorney, Agent, or Firm* — Holland & Hart LLP

(57) ABSTRACT

Methods, systems, and devices for wireless communications are described. A user equipment (UE) may include an L shaped antenna module, which may include a first array of antenna elements in one dimension and a second array of antenna elements in a second dimension. In an L shaped antenna module, antenna element configurations may be used that combine antenna elements across the two sides of the “L”. In some aspects, a UE may dynamically select a configuration of antenna elements of an L shaped antenna module to enhance performance and power consumption. In some aspects, the UE may select whether to use a cross-polarization configuration or a co-polar configuration for the L shaped antenna module.

19 Claims, 18 Drawing Sheets

205-c

Side 2
215-a

Layer 0
Layer 0
Layer 1
Layer 0

325
220-a
H Pole
V Pole
220-b
220-c
220-d
220-e
220-f

Side 1
210-a

SELECTING ANTENNA ELEMENTS WITH AN L SHAPED ANTENNA MODULE

CROSS REFERENCE

The present application for patent claims the benefit of U.S. Provisional Patent Application No. 63/259,922 by Raghavan et al., entitled "SELECTING ANTENNA ELEMENTS WITH AN L SHAPED ANTENNA MODULE," filed Sep. 15, 2022, and the benefit of U.S. Provisional Patent Application No. 63/381,737 by Raghavan et al., entitled "SELECTING ANTENNA ELEMENTS WITH AN L SHAPED ANTENNA MODULE," filed Oct. 31, 2022, each of which is assigned to the assignee hereof, and each of which is expressly incorporated by reference herein in its entirety.

INTRODUCTION

The following relates to wireless communications, relating to selecting antenna elements with an L shaped antenna module.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support selecting antenna elements with an L shaped antenna module. For example, the described techniques provide for configuration of antenna elements of an L shaped antenna module at a network node based on measurement information of one or more reference signals. An L shaped antenna module may include a first array of antenna elements in one dimension (e.g., plane or side) and a second array of antenna elements in a second dimension (e.g., plane or side). In an L shaped antenna module, antenna element configurations may be used that combine antenna elements across the two sides of the "L". Each antenna element may be dual polarized, meaning that there is a horizontal (H) polarization and a vertical (V) polarization (or an equivalent set of slant-45 degrees and slant-minus 45 degrees polarization) for each antenna element. In some aspects, a network node (e.g., a user equipment (UE)) may dynamically select a configuration of antenna elements of an L shaped antenna module to enhance performance and power consumption. In some aspects, the UE may report the selected antenna element configuration to a network entity, and the network entity may select a transmission configuration indicator (TCI) state to use for communications with the UE based on the reported antenna element configuration. In some aspects, the UE may determine a TCI state to use for communications with the network entity based on the selected antenna element configuration. In some aspects, the UE may select whether to use a cross-polarization configuration or a co-polar configuration. In some aspects, the UE may report whether the UE is using a cross-polarization configuration or a co-polarization configuration to the network entity. The network entity may adjust transmission power and rates based on whether the UE is using a cross-polarization configuration or a co-polarization configuration.

A method for wireless communications at a first network node is described. The method may include transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension, receiving, from the second network node, scheduling information for a set of reference signals based on the type of the antenna module, receiving, via the set of antenna elements, the set of reference signals in accordance with the scheduling information, generating, based on the set of reference signals, measurement information corresponding to a set of multiple antenna element configurations for the set of antenna elements, and transmitting, to the second network node, second control information based on the measurement information.

A first network node for wireless communication is described. The first network node may include a processing system configured to transmit, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension, receive, from the second network node, scheduling information for a set of reference signals based on the type of the antenna module, receive, via the set of antenna elements, the set of reference signals in accordance with the scheduling information, generate, based on the set of reference signals, measurement information corresponding to a set of multiple antenna element configurations for the set of antenna elements, and transmit, to the second network node, second control information based on the measurement information.

Another apparatus for wireless communications at a first network node is described. The apparatus may include means for transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension, means for receiving, from the second network node, scheduling information for a set of reference signals based on the type of the antenna module, means for receiving, via the set of antenna elements, the set of reference signals in accordance with the scheduling information, means for generating, based on the set of reference signals, measurement information corresponding to a set of multiple antenna element configurations for the set of antenna elements, and means for transmitting, to the second network node, second control information based on the measurement information.

A non-transitory computer-readable medium having code for wireless stored thereon is described. The code when executed by a first network node, causes the network node to transmit, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension, receive, from the second network node, scheduling information for a set of reference signals based on the type of the antenna module, receive, via the set of antenna elements, the set of reference signals in accordance with the scheduling information, generate, based on the set of reference signals, measurement information corresponding to a set of multiple antenna element configurations for the set of antenna elements, and transmit, to the second network node, second control information based on the measurement information.

Some examples of the method, apparatuses, and non-transitory computer-readable medium described herein may further include operations, features, means, or instructions for determining, based on the measurement information, a first antenna element configuration of the set of multiple antenna element configurations, where the second control information includes an indication of the first antenna element configuration.

Some examples of the method, apparatuses, and non-transitory computer-readable medium described herein may further include operations, features, means, or instructions for receiving, from the second network node, an indication of a TCI state based on the indication of the first antenna element configuration.

In some examples of the method, apparatuses, and non-transitory computer-readable medium described herein, generating the measurement information may include operations, features, means, or instructions for determining a respective signal strength measurement for each antenna element configuration of the set of multiple antenna element configurations, where each of the set of multiple antenna element configurations may be associated with a same power consumption level.

Some examples of the method, apparatuses, and non-transitory computer-readable medium described herein may further include operations, features, means, or instructions for receiving, from the second network node, third control information including an indication of an association between each antenna element configuration and a respective TCI state, and where the indication of the first antenna element configuration includes an indication of the respective TCI state associated with the first antenna element configuration.

In some examples of the method, apparatuses, and non-transitory computer-readable medium described herein, generating the measurement information may include operations, features, means, or instructions for determining a respective reference signal received power measurement for each antenna element configuration of the set of multiple antenna element configurations, where the second control information includes an indication of the respective reference signal received power (RSRP) measurements.

Some examples of the method, apparatuses, and non-transitory computer-readable medium described herein may further include operations, features, means, or instructions for receiving, from the second network node, an indication of a TCI state based on the second control information.

In some examples of the method, apparatuses, and non-transitory computer-readable medium described herein, each antenna element of the set of antenna elements may be associated with a first polarization layer and a second polarization layer, at least one antenna element configuration of the set of multiple antenna element configurations includes a cross-polarization configuration between antenna elements of the first array and antenna elements of the second array, and at least one antenna element configuration of the set of multiple antenna element configurations includes a co-polarization configuration between antenna elements of the first array and antenna elements of the second array.

Some examples of the method, apparatuses, and non-transitory computer-readable medium described herein may further include operations, features, means, or instructions for transmitting, to the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, where each antenna element of the set of antenna elements may be associated with a first polarization layer and a second polarization layer, where reception of the set of reference signals may be in response to the third control information.

In some examples of the method, apparatuses, and non-transitory computer-readable medium described herein, generating the measurement information may include operations, features, means, or instructions for determining whether a signal strength measurement for a single reference signal for one of the cross-polarization configuration or the co-polarization configuration satisfies a threshold, where the set of reference signals includes the single reference signal.

In some examples of the method, apparatuses, and non-transitory computer-readable medium described herein, generating the measurement information may include operations, features, means, or instructions for generating a first RSRP measurement for a first reference signal for the cross-polarization configuration and generate a second RSRP measurement for a second reference signal for the co-polarization configuration, where the set of reference signals includes the first reference signal and the second reference signal.

Some examples of the method, apparatuses, and non-transitory computer-readable medium described herein may further include operations, features, means, or instructions for receiving, from the second network node, fourth control information including an indication to dynamically switch between the co-polarization configuration and the cross-polarization configuration based on the second control information.

In some examples of the method, apparatuses, and non-transitory computer-readable medium described herein, the first dimension may be perpendicular to the second dimension.

In some examples of the method, apparatuses, and non-transitory computer-readable medium described herein, the antenna module includes a third array of antenna elements in a third dimension that may be different than the first dimension and the second dimension.

Some examples of the method, apparatuses, and non-transitory computer-readable medium described herein may further include operations, features, means, or instructions for selecting, based on the set of reference signals, two of the first array, the second array, and the third array and communicating with the second network node via the selected two of the first array, the second array, and the third array.

Some examples of the method, apparatuses, and non-transitory computer-readable medium described herein may further include operations, features, means, or instructions for selecting, based on the set of reference signals, an antenna element configuration of the antenna elements of the selected two of the first array, the second array, and the third array.

In some examples of the method, apparatuses, and non-transitory computer-readable medium described herein, transmitting the first control information may include operations, features, means, or instructions for transmitting the first control information including an indication that the type of the antenna module includes the third array of antenna elements in the third dimension that may be different than the first dimension and the second dimension and an indication that the first network node may be capable of dynamically selecting two of the first array, the second array, and the third array.

In some examples of the method, apparatuses, and non-transitory computer-readable medium described herein, the third dimension may be perpendicular to the first dimension and the second dimension.

A method for wireless communications at a first network node is described. The method may include receiving, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension, transmitting, to the second network node, scheduling information for a set of reference signals based on the type of the antenna module, transmitting, to the second network node, the set of reference signals in accordance with the scheduling information, and receiving, from the second network node, second control information based on measurement information associated with the type of the antenna module at the second network node for the set of reference signals.

A first network node for wireless communication is described. The first network node may include a processing system configured to receive, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension, transmit, to the second network node, scheduling information for a set of reference signals based on the type of the antenna module, transmit, to the second network node, the set of reference signals in accordance with the scheduling information, and receive, from the second network node, second control information based on measurement information associated with the type of the antenna module at the second network node for the set of reference signals.

Another apparatus for wireless communications at a first network node is described. The apparatus may include means for receiving, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension, means for transmitting, to the second network node, scheduling information for a set of reference signals based on the type of the antenna module, means for transmitting, to the second network node, the set of reference signals in accordance with the scheduling information, and means for receiving, from the second network node, second control information based on measurement information associated with the type of the antenna module at the second network node for the set of reference signals.

A non-transitory computer-readable medium having code for wireless stored thereon is described. The code when executed by a first network node, causes the network node to receive, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension, transmit, to the second network node, scheduling information for a set of reference signals based on the type of the antenna module, transmit, to the second network node, the set of reference signals in accordance with the scheduling information, and receive, from the second network node, second control information based on measurement information associated with the type of the antenna module at the second network node for the set of reference signals.

In some examples of the method, apparatuses, and non-transitory computer-readable medium described herein, the second control information includes an indication of a first antenna element configuration for the set of antenna elements.

Some examples of the method, apparatuses, and non-transitory computer-readable medium described herein may further include operations, features, means, or instructions for transmitting, to the second network node, an indication of a TCI state based on the indication of the first antenna element configuration.

Some examples of the method, apparatuses, and non-transitory computer-readable medium described herein may further include operations, features, means, or instructions for transmitting, to the second network node, third control information including an indication of an association between each antenna element configuration of a set of multiple antenna element configurations and a respective TCI state, where the set of multiple antenna element configurations includes the first antenna element configuration, and where the indication of the first antenna element configuration includes an indication of the respective TCI state associated with the first antenna element configuration.

In some examples of the method, apparatuses, and non-transitory computer-readable medium described herein, the second control information includes an indication of respective RSRP measurements associated with a set of multiple antenna element configurations for the set of antenna elements.

Some examples of the method, apparatuses, and non-transitory computer-readable medium described herein may further include operations, features, means, or instructions for transmitting, to the second network node, an indication of TCI state based on the second control information.

Some examples of the method, apparatuses, and non-transitory computer-readable medium described herein may further include operations, features, means, or instructions for receiving, from the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, where each antenna element of the set of antenna elements may be associated with a first polarization layer and a second polarization layer, and where transmission of the set of reference signals may be in response to the third control information.

In some examples of the method, apparatuses, and non-transitory computer-readable medium described herein, the set of reference signals includes a single reference signal and the second control information includes an indication of one or the co-polarization configuration or the cross-polarization configuration.

In some examples of the method, apparatuses, and non-transitory computer-readable medium described herein, the set of reference signals includes a first reference signal and a second reference signal and the second control information includes an indication of one or the co-polarization configuration or the cross-polarization configuration.

In some examples of the method, apparatuses, and non-transitory computer-readable medium described herein, the first control information further indicates that the first dimension may be perpendicular to the second dimension.

In some examples of the method, apparatuses, and non-transitory computer-readable medium described herein, receiving the first control information may include operations, features, means, or instructions for receiving the first control information including an indication that the type of the antenna module includes a third array of antenna elements in a third dimension that may be different than the first dimension and the second dimension and an indication that the first network node may be capable of dynamically selecting two of the first array, the second array, and the third array.

DETAILED DESCRIPTION

Figure 1:
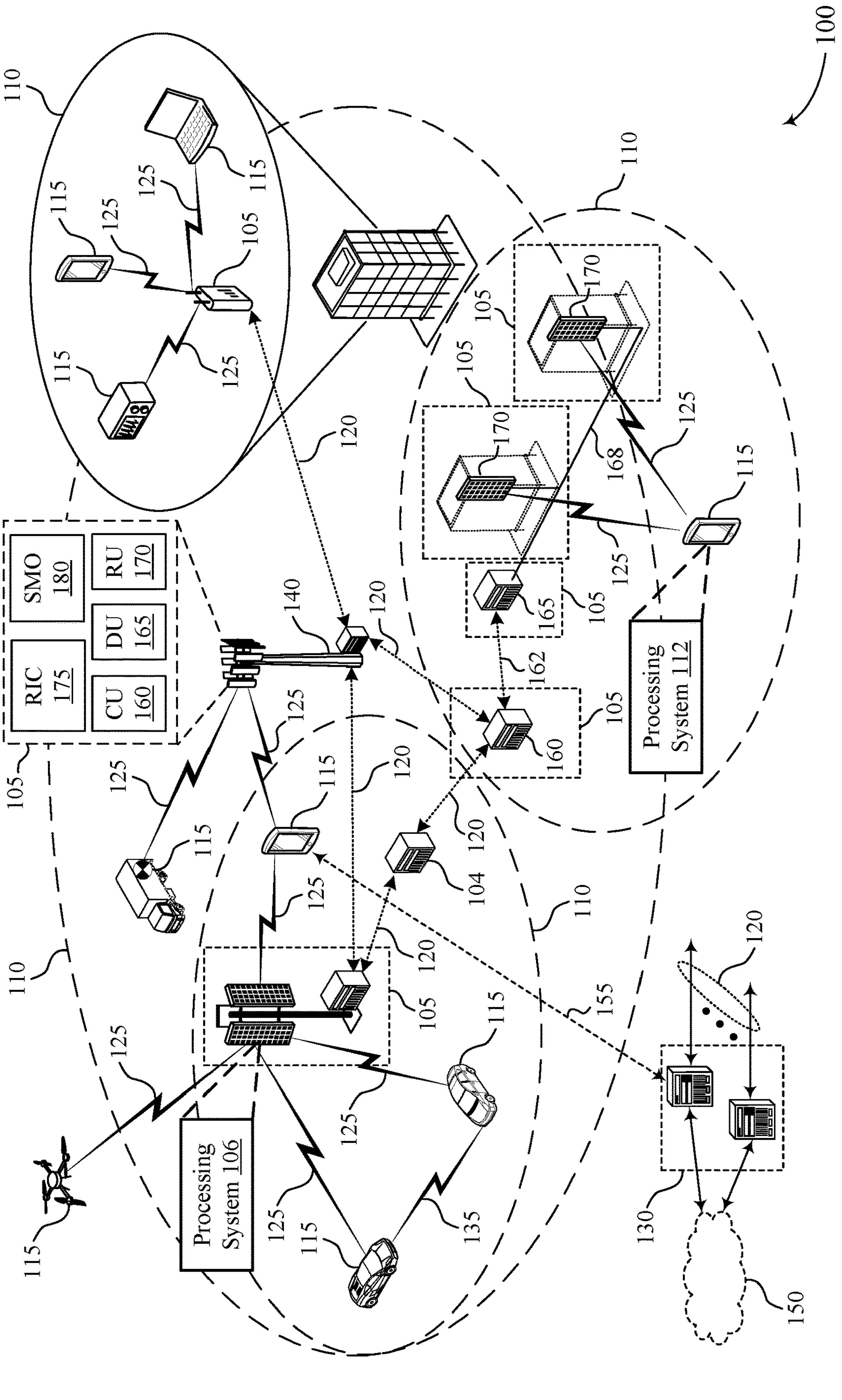
FIG. 1 illustrates an example of a wireless communications system that supports selecting antenna elements with an L shaped antenna module in accordance with one or more aspects of the present disclosure.

A user equipment (UE) may include an L shaped antenna module. An L shaped antenna module may include a first array of antenna elements in one dimension (e.g., plane or side) and a second array of antenna elements in a second dimension (e.g., plane or side). In an L shaped antenna module, antenna element configurations may be used that combine antenna elements across the two sides of the “L”. Each antenna element may be dual polarized. For example, there may be a horizontal (H) layer and a vertical (V) layer for each antenna element. Alternately, antenna elements may be of slant-45 degrees configuration on one layer and slant-minus 45 degrees configuration on a second layer. In general, it may be assumed that the antennas are on two orthogonal polarizations on the two layers. In some aspects, a UE may be statically configured to combine the H pol antennas on one side of the “L” with the H pol antennas on the other side of the “L”, and to combine the V pol antennas on one side of the “L” with the V pol antennas on the other side of the “L”. In some aspects, a static configuration may lead to sub-optimal performance depending on the angle of interest of a beamformed received or transmitted signal. Additionally or alternatively, in some cases, less than all of the antenna elements may be used in order to save power. Blockages (e.g., due to finger placement on a phone), may result in some antenna elements having lower gain than other antenna elements.

In some aspects, a UE may dynamically select a configuration of antenna elements of an L shaped antenna module to enhance performance and power consumption. A UE may report, to a network entity, that the UE has one or more L shaped antenna modules, and the network entity may schedule one or more reference signals based on the report. The UE may receive one or more scheduled reference signals from the network entity. Based on measurements of the reference signals using different antenna element configurations, the UE may select an antenna element configuration.

For example, the measurements may be reference signal received power (RSRP) measurements, reference signal received quality (RSRQ) measurements, signal to noise ratio (SNR) measurements, signal to interference and noise ratio (SINR) measurements, or carrier to interference ratio (CIR) measurements. In some aspects, the UE may report the selected antenna element configuration to the network entity, and the network entity may select a transmission configuration indicator (TCI) state to use for communications with the UE based on the reported antenna element configuration. In some aspects, the UE may determine a TCI state to use for communications with the network entity based on the selected antenna element configuration.

In some aspects, the UE may select whether to use a cross-polarization configuration or a co-polar configuration. A co-polarization configuration refers to a configuration that combines the H pol antennas on a first side of the "L" with the H pol antennas on the other side of the "L", and combines the V pol antennas on one first side of the "L" with the V pol antennas on the other side of the "L". A cross-polarization configuration refers to a configuration that combines the H pol antennas on the first side of the "L" with the V pol antennas on the other side of the "L", and combines the V pol antennas on the first side of the "L" with the H pol antennas on the other side of the "L". The UE may report whether the UE is using a cross-polarization configuration or a co-polarization configuration to the network entity. The network entity may adjust transmission power and rates based on whether the UE is using a cross-polarization configuration or a co-polarization configuration.

Aspects of the disclosure are initially described in the context of wireless communications systems. Aspects of the disclosure are further illustrated by and described with reference to a UE diagram, a polarization diagram, an antenna module diagram, and a process flow. Aspects of the disclosure are further illustrated by and described with reference to apparatus diagrams, system diagrams, and flowcharts that relate to selecting antenna elements with an L shaped antenna module.

FIG. 1 illustrates an example of a wireless communications system 100 that supports selecting antenna elements with an L shaped antenna module in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As shown, the network node (e.g., network entity 105) may include a processing system 106. Similarly, the network node (e.g., UE 115) may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an "input" and "input information" may be used interchangeably. Similarly, as described herein, an "output" and "output information" may be used interchangeably. Any information generated by any component may be provided to one or more other systems or components of, for example, a network node described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network node described herein may interface with one or more other components of the network node, may process information received from one or more other components (such as input information), or may output information to one or more other components. For example, a processing system may include a first component configured to interface with one or more other components of the network node to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network node may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support selecting antenna elements with an L shaped antenna module as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term “cell” may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communications system 100, some UEs 115 and network entities 105 may use multiple antennas in millimeter wave systems and at higher carrier frequencies such as those at sub-Terahertz frequencies. Multiple antennas can also be used at frequencies such as those between 7.125 GHz and 24.25 GHz. Beamforming from multiple antennas may be used in in millimeter wave systems, for example to bridge the link budget. UEs 115 and/or network entities 105 may include multiple antenna modules or antenna panels, with each antenna module or panel including a set of antenna elements that may be co-phased in beamforming. Use of multiple modules or panels may allow for the ability to meet spherical coverage requirements with or without blockage (e.g., hand or body blockages at a UE 115). Use of multiple modules may allow for increased robustness with beam switching over the antenna modules. Some UEs 115 may include three antenna modules on three edges (e.g., two antenna modules on the long edge and one on the top or bottom short edge of the UE 115). For example, each antenna module of a three antenna module UE may include a 4×1 or a 5×1 dual polarized antenna array. Different antenna module designs and configurations may be used, for example, for millimeter wave systems. For example, more antenna elements may be designed in an antenna module (e.g., more than 5×1). As another example, a smaller number of antenna modules or panels may be used (e.g., less than three). For example, millimeter wave communications may be used for lower cost devices, and reducing the number of antenna modules or panels may decrease cost. Different manufacturers may place antenna modules at different locations for beamforming and performance tradeoff purposes.

Figure 2A:
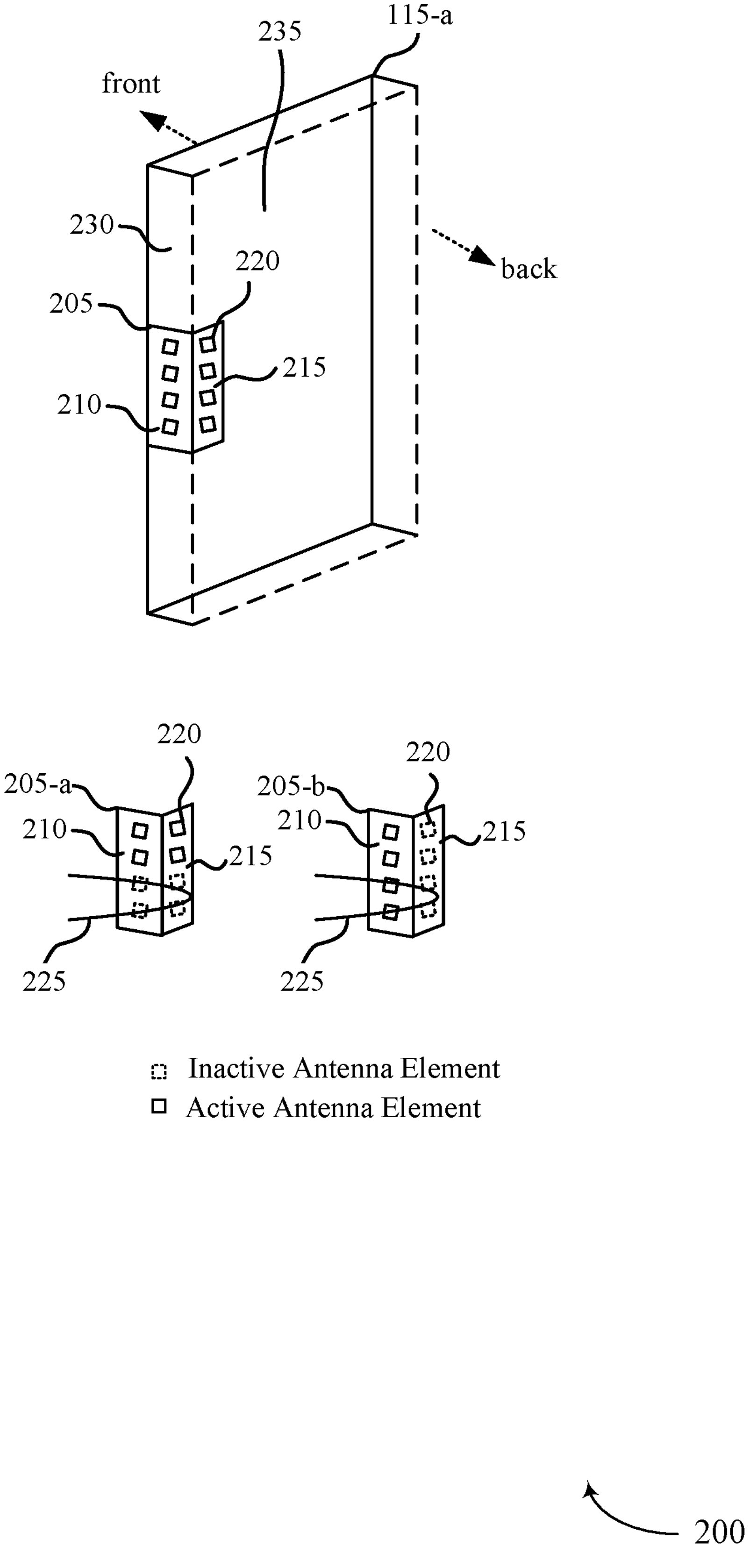
FIGS. 2A and 2B illustrate an example of a user equipment (UE) diagram that supports selecting antenna elements with an L shaped antenna module in accordance with one or more aspects of the present disclosure.

Some UEs 115 may include an L shaped antenna module, meaning that the antenna module includes a first array of antenna elements in one dimension (e.g., plane or side) and a second array of antenna elements in a second dimension (e.g., plane or side). An example UE 115 with an L shaped antenna module is illustrated in FIG. 2A. In an L shaped antenna module, antenna element configurations may be used that combine antenna elements across the two sides of the "L". Each antenna element may be dual polarized, meaning there is a H polarization and a V polarization (or an equivalent set of slant-45 degrees and slant-minus 45 degrees polarization) for each antenna element.

In some aspects, a UE 115 may be statically configured to combine the H pol antennas on one side of the "L" with the H pol antennas on the other side of the "L", and to combine the V pol antennas on one side of the "L" with the V pol antennas on the other side of the "L". In some aspects, a UE 115 may dynamically select a configuration of antenna elements of an L shaped antenna module to enhance performance and power consumption. A UE 115 may report, to a network entity 105, that the UE 115 has one or more L shaped antenna modules, and the network entity may schedule one or more reference signals based on the report. The UE 115 may receive one or more scheduled reference signals from the network entity 105. Based on measurements of the reference signals using different antenna element configurations, the UE 115 may select an antenna element configuration. For example, the measurements may be RSRP measurements, RSRQ measurements, SNR measurements, SINR measurements, or CIR measurements. In some aspects, the UE 115 may report the selected antenna element configuration to the network entity 105, and the network entity 105 may select a TCI state to use for communications with the UE 115 based on the reported antenna element configuration. In some aspects, the UE 115 may determine a TCI state to use for communications with the network entity 105 based on the selected antenna element configuration.

In some aspects, the UE 115 may select whether to use a cross-polarization configuration or a co-polar configuration. The UE 115 may report to the network entity 105 whether the UE 115 is using a cross-polarization configuration or a co-polarization configuration to the network entity. The network entity 105 may adjust transmission power and rates based on whether the UE 115 is using a cross-polarization configuration or a co-polarization configuration.

FIG. 2A illustrates an example of a UE diagram 200 that supports selecting antenna elements with an L shaped antenna module in accordance with one or more aspects of the present disclosure. In some aspects, the UE diagram 200 may implement aspects of wireless communications systems 100. For example, the UE diagram 200 may include a UE 115-*a*, which may be an example of a UE 115 as described herein.

As described herein, some UEs, such as the UE 115-*a*, may include an L shaped antenna module 205. The L shaped antenna module 205 may be mounted on a long edge 230 and a back edge 235 of the UE 115-*a*. The L shaped antenna module 205 includes a first side 210 and a second side 215, which may be approximately at a 90 degree angle with respect to each other. Each of the first side 210 and the second side 215 of the L shaped antenna module may include a number of antenna elements 220.

Antenna elements 220 across the first side 210 and the second side 215 may be combined relative to antenna selection across only one side of the L shaped antenna module 205. For example, each antenna element 220 may be dual polarized. In some aspects, the UE 115-*a* may be statically configured to combine the H pol antennas on one side of the "L" with the H pol antennas on the other side of the "L", and to combine the V pol antennas on one side of the "L" with the V pol antennas on the other side of the "L".

In some aspects, the UE 115-*a* may dynamically select a configuration of antenna elements 220 to enhance performance and power consumption. For example, the UE 115-*a* may selectively activate the antenna elements 220, and accordingly some antenna elements 220 may be inactive and some antenna elements may be active. The L shaped antenna module 205-*a* shows an example where the top two antenna elements 220 on the first side 210 and the second side 215 are active, and the bottom two antenna elements 220 on the first side 210 and the second side 215 are inactive (e.g., a 2×2 configuration). The L shaped antenna module 205-*b* shows an example where the antenna elements 220 on the first side 210 are active, and the antenna elements 220 on the second side 215 are inactive (e.g., a 4×1 configuration). If each antenna element 220 uses the same amount of power, the L shaped antenna module 205-*a* and the L shaped antenna module 205-*b* may consume the same amount of power (as each uses 4 active antenna elements 220) from within the same radio frequency integrated circuit (RFIC).

In some aspects, a blockage 225 (e.g., caused by a finger of a user hand holding the UE 115-*a*) may block some antenna elements (e.g., the bottom antenna elements 220 of the L shaped antenna module 205) resulting in a partial blockage. In a partial blockage scenario, the configuration of the L shaped antenna module 205-*a* may have better performance than the configuration of the L shaped antenna module 205-*b*. In some examples, in a full blockage scenario, the L shaped antenna module 205-*a* may have better performance than the configuration of the L shaped antenna module 205-*b*. In some aspects, in the absence of a blockage, the L shaped antenna module 205-*a* may have a similar performance as the configuration of the L shaped antenna module 205-*b*. In some aspects, based on the incident angle of a beamformed transmitted or received signal, one of the L shaped antenna module 205-*a* or the L shaped antenna module 205-*a* may have better performance.

Accordingly, as described herein, in some aspects, the UE 115-*a* may dynamically select a configuration of antenna elements 220 of the L shaped antenna module 205 to enhance performance and power consumption. The UE 115-*a* may report, to a network entity 105, that the UE 115-*a* has an L shaped antenna module 205, and the network entity 105 may schedule one or more reference signals based on the report. The UE 115-*a* may receive one or more scheduled reference signals from the network entity 105. Based on measurements of the reference signals using different antenna element configurations of the L shaped antenna module 205, the UE 115-*a* may select an antenna element configuration. In some aspects, the UE 115-*a* may report the selected antenna element configuration to the network entity, and the network entity 105 may select a TCI state to use for communications with the UE 115-*a* based on the reported antenna element configuration. In some aspects, the UE 115-*a* may determine a TCI state to use for communications with the network entity 105 based on the selected antenna element configuration.

Figure 2B:
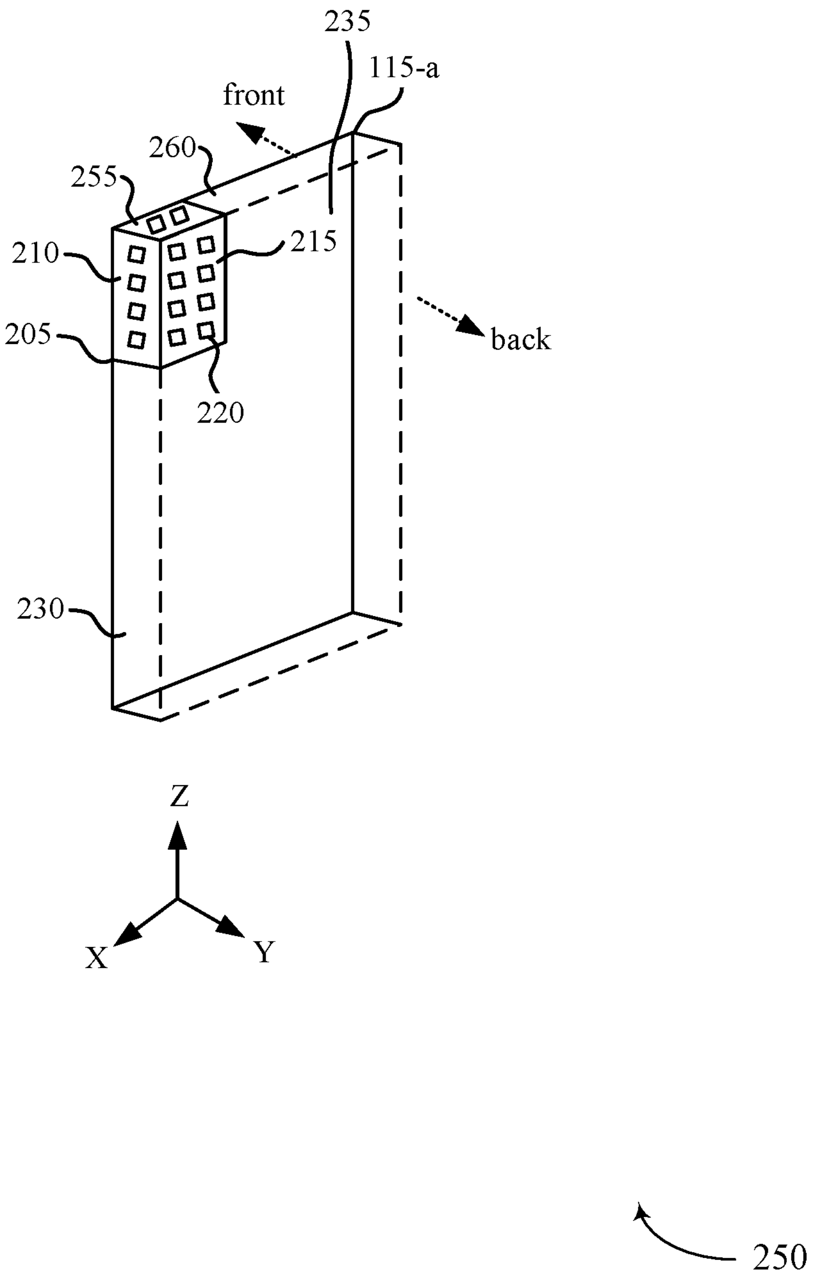

FIG. 2B illustrates an example of a UE diagram 250 that supports selecting antenna elements with an L shaped antenna module in accordance with one or more aspects of the present disclosure. In some aspects, the UE diagram 250 may implement aspects of wireless communications systems 100. For example, the UE diagram 250 may include a UE 115-*a* as described with reference to FIG. 2A.

In some examples, as shown in the UE diagram 250, the antenna module 205 of the UE 115-*a* may include a third side 255 mounted on a short edge 260 of the UE 115-*a*. The third side 255 may be approximately at a 90 degree angle with respect to each of the first side 210 (on the long edge 230) and the second side 215 (on the back edge 235). Similar to the first side and the second side 215, the third side 255 may include a number of antenna elements.

In some examples, the antenna module 205 may be L-shaped (e.g., may include 2 sides (e.g., two of the first side 210, the second side 215, or the third side 255). For example, in a first design, the antenna module 205 may include the first side 210 and the second side 215, and not the third side 255 (e.g., as described with reference to FIG. 2A). In a second design, the antenna module may include the first side 210 and the third side 255, and not the second side 215. In the first design, the first side 210 has a boresight along the X axis and scans along the XZ plane and the second side 215 has a boresight along the Y axis and scans along the YZ plane. In the second design, the first side 210 has a boresight along the X axis and scans along the XZ plane and the third side 255 has a boresight along the Z axis and scans along the XZ plane. Due to scanning plane redundancies with the two sides that may lead to overlap in terms of coverage region, in some examples, beam weights may be designed for the second design in a more efficient manner (lesser number of beam weights for the same performance) than with the first design. For example, the second design may operate similarly to a linear array, while the first design may operate more like a 2-dimensional/planar array.

In some aspects, the first design may be more practical in terms of module placement as the performance may be invariant to location (e.g., as long as an edge (e.g., the long edge 230) and back placement (the back edge 235) is possible). The first design may afford more flexibility than the second design. In the second design, the routing of feedlines from RFIC to farther antenna elements 220 may be easier as compared to the first design. The second design may also suffer less from hand blockage, as a user of a UE 115-*a* typically does not place a hand on a corner of the device. Further, the second design may have a better spherical coverage as the second design may be used to focus towards a network entity 105 in an upright mode (which is a typical use case). Beam management overhead may also be smaller with the second design (as compared to the first design). The second design, however, may compete with space for sub-6 GHz, Bluetooth, Wi-Fi, and/or near field communications (NFC) antennas.

In some aspects, as shown in the UE diagram 250, the UE 115-*a* may include an antenna module 205 that includes three sides (e.g., encompasses the first and second designs). In some aspects, the UE 115-*a* may dynamically select between the two designs (e.g., may select two of the three sides (e.g., either the first side 210 and the second side 215, or the first side 210 and the third side 255)) based on channel conditions and use-case requirements. Such a dynamic selection of sides of the antenna module 205 may be based on better spherical coverage performance, routing loss, or more resilience to blockage. In some aspects, radio frequency connections between the sides (the first side 210, the second side 215, and the third side 255) may be rewired dynamically based on the selection.

Figure 3:
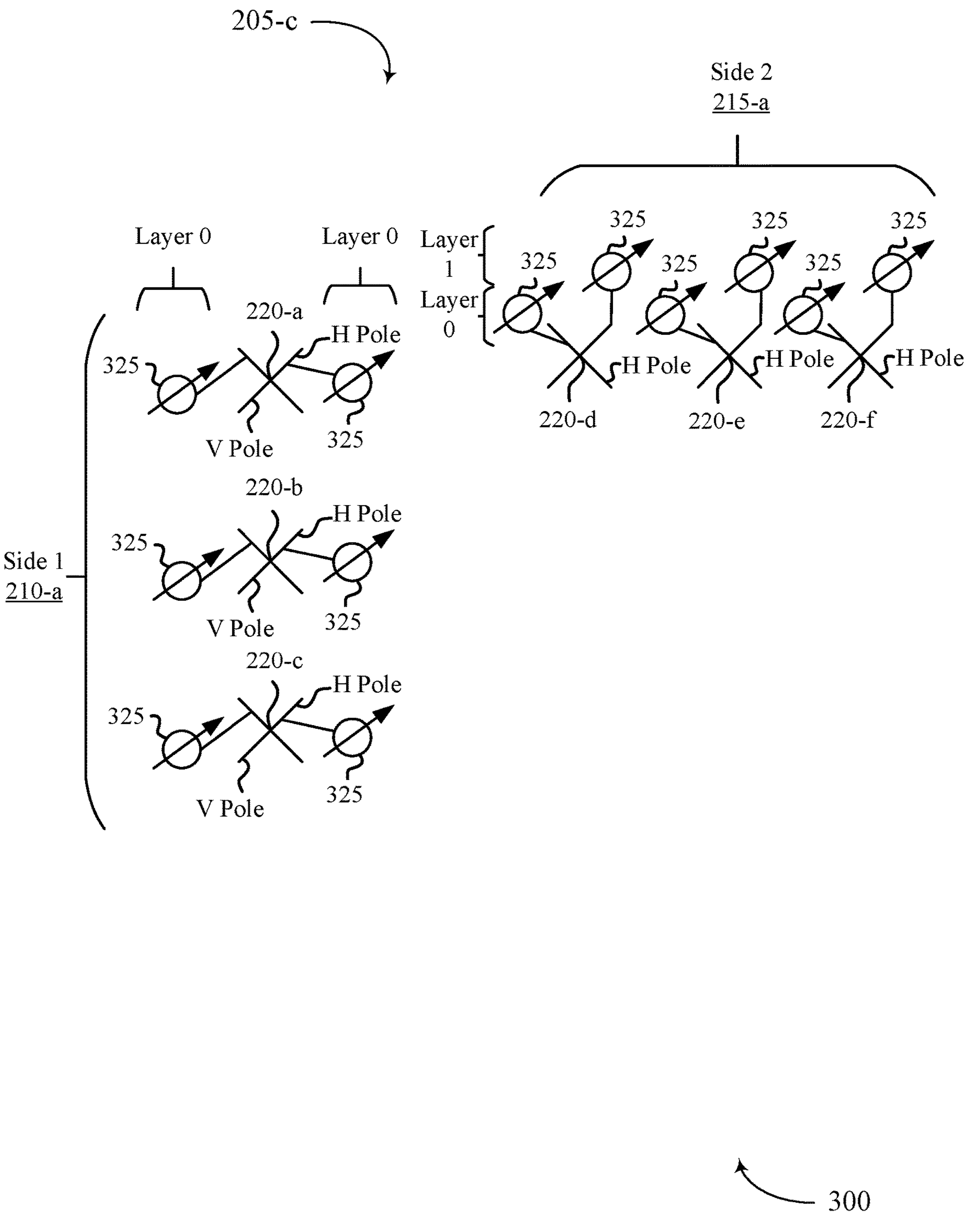
FIG. 3 illustrates an example of a polarization diagram that supports selecting antenna elements with an L shaped antenna module in accordance with one or more aspects of the present disclosure.

FIG. 3 illustrates an example of a polarization diagram 300 that supports selecting antenna elements with an L shaped antenna module in accordance with one or more aspects of the present disclosure. In some aspects, the polarization diagram 300 may implement aspects of wireless communications systems 100 or the UE diagram 200. For example, the polarization diagram 300 may implement an L shaped antenna module 205 as described with respect to FIG. 2.

A UE 115 may include an L shaped antenna module 205-*c* that includes a number of antenna elements (e.g., an antenna element 220-*a*, an antenna element 220-*b*, and an antenna element 220-*c*) on a first side 210-*a* of the L shaped antenna module 205-*c* and a number of antenna elements (e.g., an antenna element 220-*d*, an antenna element 220-*e*, and an antenna element 220-*f*) on a second side 215-*a* of the L shaped antenna module 205-*c*. Each of the antenna elements (e.g., the antenna element 220-*a*, the antenna element 220-*b*, the antenna element 220-*c*, the antenna element 220-*d*, the antenna element 220-*e*, and the antenna element 220-*f*) may be dual polarized. In a linear or planar antenna array, antenna elements on the H pol may be combined for one layer and antenna elements on the V pol may be combined for a second layer. In the L shaped antenna module 205-*c*, the H antennas on the first side 210-*a* may be combined with the H antennas or the V antennas on the second side 215-*a*. Similarly, in the L shaped antenna module 205-*c*, the V antennas on the first side 210-*a* may be combined with the H antennas or the V antennas on the second side 215-*a*. Whether the H antennas on one side should be combined with the V antennas or the H antennas on the other side for optimal performance may depend on the angle of interest of a beamformed received or transmitted signal 325 and polarization properties of the UE 115.

In some examples, a UE 115 may be statically configured to combine the H pole antennas on the first side 210-*a* with the H pole antennas on the second side 215-*a* and to combine the V pole antennas on first side 210-*a* with the V pole antennas the second side 215-*a*. Based on the angle of interest of the received or transmitted signal 325 and/or the polarization properties of the UE 115, a static configuration may lead to sub-optimal performance. Dynamic (e.g., unconstrained) polarization combining may result in better array gain than a static polarization combining configuration. For example, for a spherical coverage, dynamic polarization combining may result in a 0.5 dB gain for 25% of the sphere, a 0.75 dB gain for 15% of the sphere, and a 1 dB gain for 10% of the sphere. The parts of the sphere where gains are seen may be those parts of the sphere where such a gain could lead to dramatically improved performance.

For example, in a dynamic polarization combining configuration, the UE 115 may combine H antennas on the first side 210-*a* with H antennas on the second side 215-*a* and V antennas on the first side 210-*a* with V antennas on the second side 215-*a* for a first angle of a beamformed received or transmitted signal 325, and the UE may combine H antennas on the first side 210-*a* with V antennas on the second side 215-*a* and V antennas on the first side 210-*a* with H antennas on the second side 215-*a* for a second angle of a beamformed received or transmitted signal 325. A UE 115 may include dynamic RF switching circuitry to enable dynamic polarization combining. Dynamic polarization combining may increase power consumption as compared to static polarization combining, and accordingly for power consumption considerations, a UE may determine in some aspects when to implement dynamic polarization combining.

Figure 4:
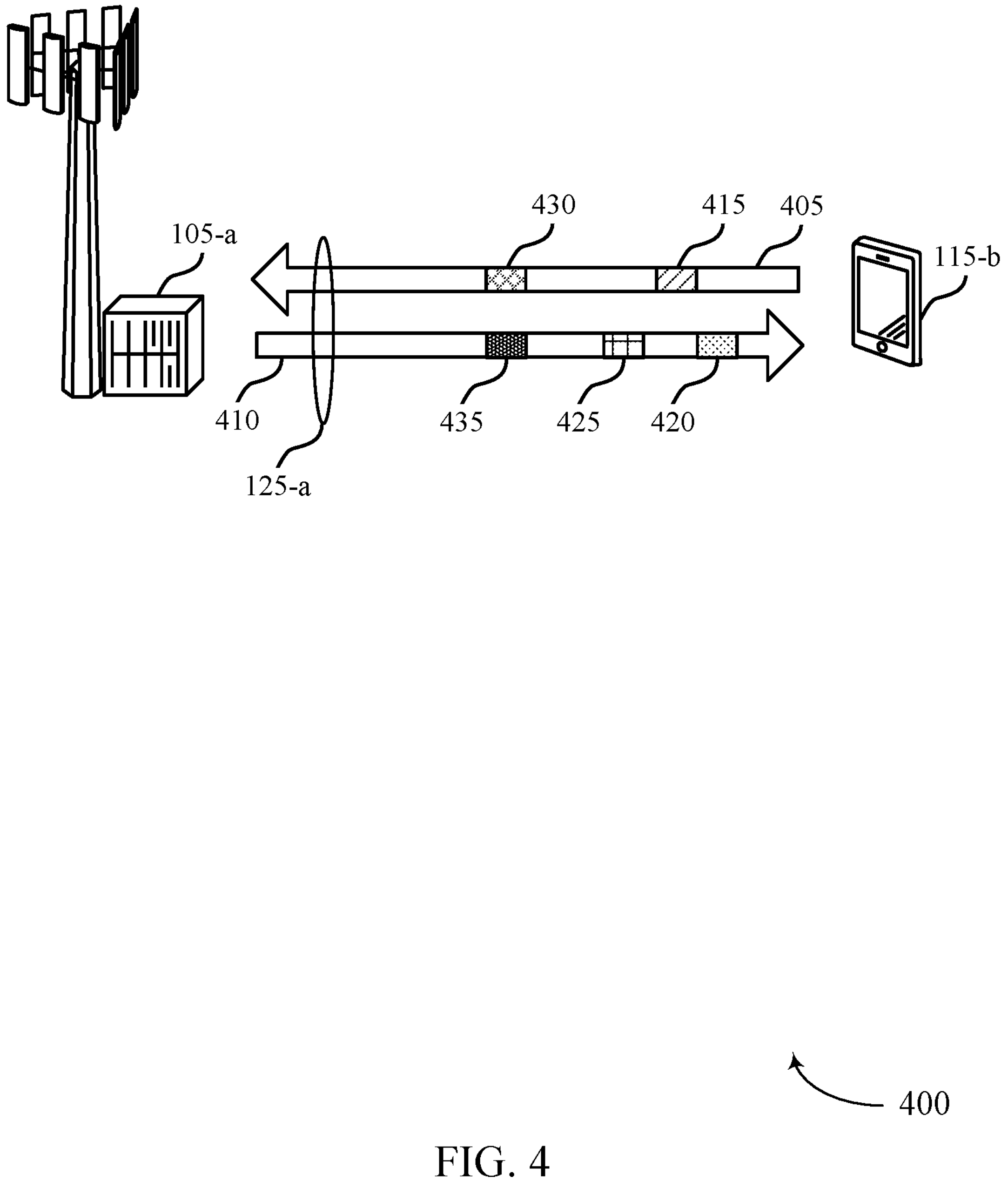
FIG. 4 illustrates an example of a wireless communications system that supports selecting antenna elements with an L shaped antenna module in accordance with one or more aspects of the present disclosure.

FIG. 4 illustrates an example of a wireless communications system 400 that supports selecting antenna elements with an L shaped antenna module in accordance with one or more aspects of the present disclosure. The wireless communications system 400 may implement aspects of wireless communications system 100. The wireless communications system 400 may include a UE 115-*b*, which may be an example of a UE 115 as described herein. The wireless communications system 400 may include a network entity 105-*a*, which may be an example of a network entity 105 as described herein.

The UE 115-*b* may communicate with the network entity 105-*a* using a communication link 125-*a*, which may be an example of an NR or LTE link between the UE 115-*b* and the network entity 105-*a*. The communication link 125-*a* may include a bi-directional link that enables both uplink and downlink communication. For example, the UE 115-*b* may transmit uplink transmissions 405, such as uplink control signals or uplink data signals, to the network entity 105-*a* using the communication link 125-*a* and the network entity 105-*a* may transmit downlink transmissions 410, such as downlink control signals or downlink data signals, to the UE 115-*b* using the communication link 125-*a*.

As described herein, the UE 115-*b* may include an antenna module that includes a set of antenna elements arranged in a first array of antenna elements in a first dimension and a second array of antenna elements in a second dimension that is different than the first dimension (e.g., an L shaped antenna module). In some aspects, the UE 115-*b* may transmit first control information 415 to the network entity 105-*a* including an indication that the UE 115-*b* includes an L shaped antenna module.

The network entity 105-*a* may transmit, and the UE 115-*b* may receive, scheduling information 420 for a set of reference signals based on the indication that the UE 115-*b* includes an L shaped antenna module. The network entity 105-*a* may transmit, and the UE 115-*b* may receive, the set of reference signals in accordance with the scheduling information. The UE 115-*b* may generate, based on the set of reference signals 425, measurement information corresponding to a set of multiple antenna element configurations for the set of antenna elements. The UE 115-*b* may transmit, to the network entity 105-*a*, second control information 430 based on the measurement information.

For example, for optimal performance of an L shaped module in a blockage mode (e.g., caused by a finger of a user holding the UE 115-*b*), from a set of antenna element configurations (that may all consume the same amount of power), the UE 115-*b* may select an antenna element configuration from the set of antenna element configurations based on the measurement information. In some examples, the UE 115-*b* may report, via the second control information 430, the selected antenna element configuration, and the network entity 105-*a* may transmit third control information 435 indicating a TCI state to use for communications with the network entity 105-*a* based on the reported antenna element configuration. In some examples, the UE 115-*b* may select a TCI state based on the selected antenna element configuration, and the UE 115-*b* may report, via the second control information 430, the selected TCI state.

Performance optimization of the selected antenna element configuration may be captured by the array gain realized with the selected antenna elements. In some aspects, the set of antenna configurations that consume the same amount of power may correspond to different choices of antenna elements within the same side of the L shaped antenna module or across the two sides of the L shaped antenna module. The UE 115-*b* may select the antenna elements, for example, based on the type of blockage (e.g., based on a user hand grip, how many antenna elements are blocked, or UE housing properties).

In some aspects, via the second control information 430, the UE 115-*b* may indicate different options of antenna element configurations that consume different power levels along with the power differential, and the network entity 105-*a* may select an antenna element configuration based on the power differentials. The network entity 105-*a* may indicate the selected antenna element configuration via the third control information 435. In some aspects, the UE 115-*b* may indicate the measurement information (e.g., RSRP, RSRQ, SINR, SNR, or CIR measurements) corresponding to the different antenna element configurations via the second control information 430, and the network entity 105-*a* may select an antenna element configuration based on the reported measurement information. The network entity 105-*a* may indicate the selected antenna element configuration via the third control information 435.

In some aspects, based on the set of reference signals 425, the UE 115-*b* may determine whether to dynamically switch between a co-polarization configuration between antenna elements and a cross-polarization configuration. For example, the UE 115-*b* may determine whether to dynamically switch between a co-polarization configuration between antenna elements and a cross-polarization configuration based on power and/or thermal overheads accrued in selecting a dynamic polarization configuration versus a static polarization combining configuration as well as potential gains for a dynamic polarization configuration. For example, the potential gains may be realized based on transmit and receive array gain improvement. The selection may also be a function of an angle of interest (e.g., corresponding to a dominant cluster and the angular spread of the dominant cluster), the number of antenna elements used in combining, the UE housing and/or UE material polarization properties, orientation difference across the two sides of the L, or the mounting of the L shaped antenna module on the UE 115-*b*. In some aspects, the UE 115-*b* may report to the network entity 105-*a* (e.g., via the second control information 430) whether the UE 115-*b* will operate in a cross-polarization configuration, a co-polarization configuration, or a dynamic switching configuration. Based on the report of the polarization configuration, the network entity 105-*a* may adjust transmission power and rate control of downlink transmissions 410 to the UE 115-*b*.

In some aspects, the UE 115-*b* may report to the network entity 105-*a* (e.g., in the first control information 415 or in other signaling), that the UE 115-*b* is capable of dynamic polarization combining (e.g., dynamically switching between a co-polarization configuration and a cross-polarization configuration). In response, the network entity 105-*a* may transmit one or more reference signals (e.g., the set of reference signals 425). In some aspects, the UE 115-*b* may determine a signal strength measurement (e.g., an RSRP, RSRQ, SNR, SINR, or CIR measurement) of one reference signal using one of a cross-polarization configuration or a co-polarization configuration. If the UE 115-*b* determines that the signal strength measurement exceeds a configured threshold, the UE 115-*b* may determine not to implement dynamic polarization combining. If the UE 115-*b* determines that the signal strength measurement does not exceed a configured threshold, the UE 115-*b* may determine to implement dynamic polarization combining (or to use the other one of the cross-polarization configuration or the co-polarization configuration). In some aspects, the UE 115-*b* may determine a first signal strength measurement (e.g., an RSRP, RSRQ, SNR, SINR, or CIR measurement) of one reference signal using a cross-polarization configuration and a second signal strength measurement of a second reference signal using a co-polarization configuration. The UE 115-*b* may select to use one of the cross-polarization configuration or the co-polarization configuration based on the first signal strength measurement and the second signal strength measurement.

In some aspects, the UE 115-*b* may report, via the second control information 430, the measurement information, and the network entity 105-*a* may determine whether the UE 115-*b* should use a static or dynamic polarization combining configuration. The network entity 105-*a* may indicate to the UE 115-*b* whether the UE 115-*b* should use a static or dynamic polarization combining configuration via the third control information 435.

Figure 5:
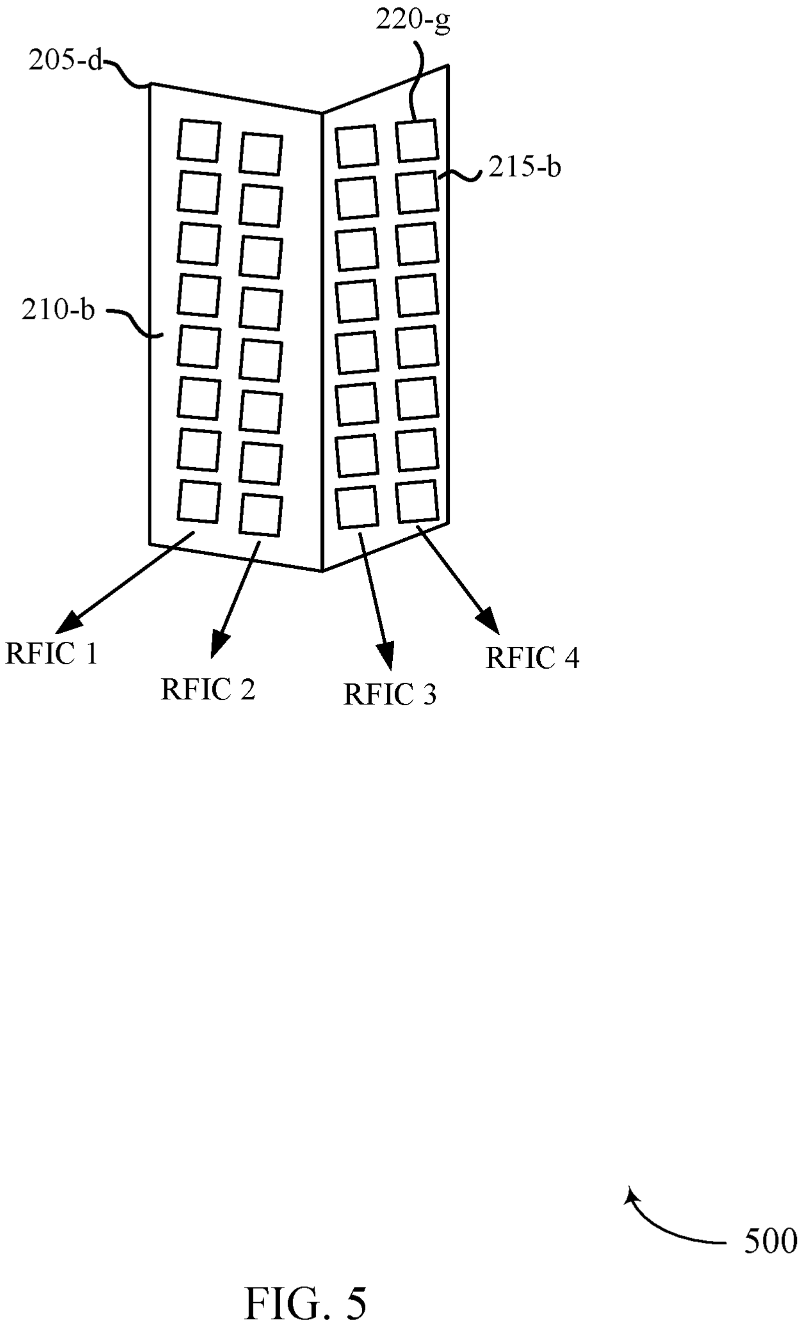
FIG. 5 illustrates an example of an antenna module diagram that supports selecting antenna elements with an L shaped antenna module in accordance with one or more aspects of the present disclosure.

FIG. 5 illustrates an example of an antenna module diagram 500 that supports selecting antenna elements with an L shaped antenna module in accordance with one or more aspects of the present disclosure. In some aspects, the antenna module diagram 500 may implement aspects of wireless communications systems 100, the wireless communications system 400, or the UE diagram 200.

As described herein, a UE 115 may include an L shaped antenna module 205-*d*, which may include a number of antenna elements 220-*g* in a first side 210-*b* of the L shaped antenna module 205-*d* and a second side 215-*b* of the L shaped antenna module 205-*d*. The UE 115 may dynamically select and combine antenna elements, for example at the radio frequency, inter-frequency, or baseband levels. In a higher band (e.g., at 60 GHz), an aperture can accommodate more antenna elements 220-*g* than the same aperture at a lower band (e.g., 28 GHz). For example, an aperture of a 4×1 array at 28 GHz may accommodate an 8×2 array at 60 GHz. At 60 GHz, one RFIC may control 16 antenna feeds over two polarizations. Accordingly, for the L shaped antenna module 205-*d*, four RFICs may be used to control the 8×2 antenna element arrays on both sides (the first side 210-*b* and the second side 215-*b*), as compared to a single RFIC which may be used to control a 4×1 antenna element array on both sides of an L shaped antenna module at 28 GHz. Similar extensions are possible to sub-Terahertz frequencies.

Figure 6:
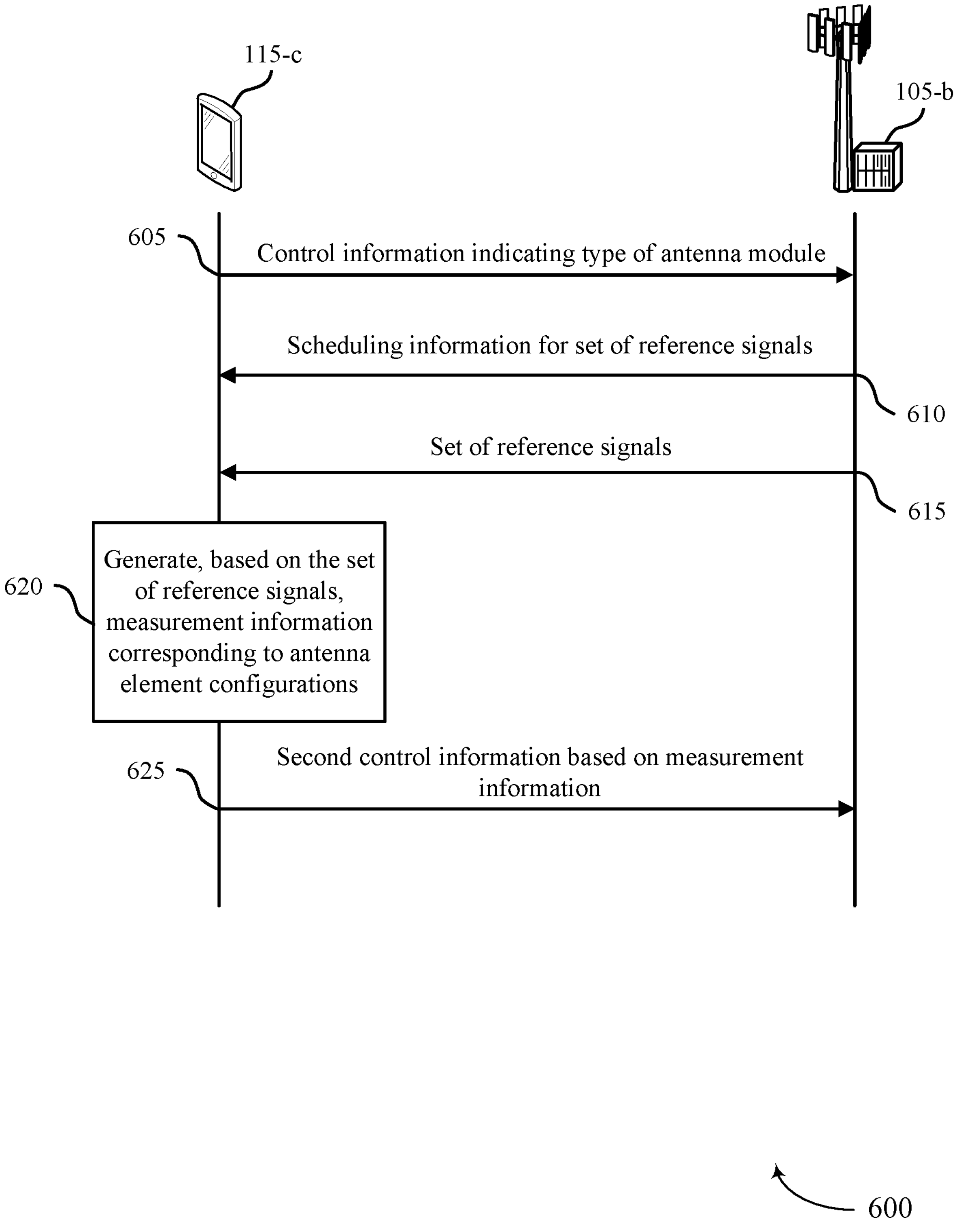
FIG. 6 illustrates an example of a process flow that supports selecting antenna elements with an L shaped antenna module in accordance with one or more aspects of the present disclosure.

FIG. 6 illustrates an example of a process flow 600 that supports selecting antenna elements with an L shaped antenna module in accordance with one or more aspects of the present disclosure. The process flow 600 may include a UE 115-*c*, which may be an example of a UE 115 as described herein. The process flow 600 may include a network entity 105-*b*, which may be an example of a network entity 105 as described herein. In the following description of the process flow 600, the operations between the network entity 105-*b* and the UE 115-*c* may be transmitted in a different order than the example order shown, or the operations performed by the network entity 105-*b* and the UE 115-*c* may be performed in different orders or at different times. Some operations may also be omitted from the process flow 600, and other operations may be added to the process flow 600.

At 605, the UE 115-*c* may transmit, to the network entity 105-*b*, first control information including an indication of a type of an antenna module of the UE 115-*c*, where the type of the antenna module includes a set of antenna elements arranged in a first array of antenna elements in a first dimension and a second array of antenna elements in a second dimension that is different than the first dimension. In some aspects, the first dimension is perpendicular to the second dimension.

At 610, the network entity 105-*b* may transmit, and the UE 115-*c* may receive, scheduling information for a set of reference signals based on the type of the antenna module.

At 615, the network entity 105-*b* may transmit, and the UE 115-*c* may receive, the set of reference signals in accordance with the scheduling information.

At 620, the UE 115-*c* may generate, based on the set of reference signals, measurement information corresponding to a set of multiple antenna element configurations for the set of antenna elements.

At 625, the UE 115-*c* may transmit, to the network entity 105-*b*, second control information based on the measurement information.

In some aspects, the UE 115-*c* may determine, based on the measurement information, a first antenna element configuration of the set of multiple antenna element configurations, and the second control information may include an indication of the first antenna element configuration. In some aspects, the UE 115-*c* may receive, from the network entity 105-*b*, an indication of a TCI state based on the indication of the first antenna element configuration. In some aspects, generating the measurement information includes determining a respective signal strength measurement (e.g., an RSRP, RSRQ, SNR, SINR, or CIR measurement) for each antenna element configuration of the set of multiple antenna element configurations, and each of the set of multiple antenna element configurations is associated with a same power consumption level. In some aspects, the UE 115-*c* may receive, from the network entity 105-*b*, third control information including an indication of an association between each antenna element configuration and a respective TCI state, and the indication of the first antenna element configuration includes an indication of the respective TCI state associated with the first antenna element configuration.

In some aspects, generating the measurement information includes determining a respective RSRP measurement (or RSRQ, SNR, SINR, or CIR measurement) for each antenna element configuration of the set of multiple antenna element configurations, and the second control information includes an indication of the respective RSRP measurements (or RSRQ, SNR, SINR, or CIR measurements).

In some aspects, the UE 115-*c* may receive, from the network entity 105-*b*, an indication of a TCI state based on the second control information.

In some aspects, each antenna element of the set of antenna elements is associated with a first polarization layer and a second polarization layer, at least one antenna element configuration of the set of multiple antenna element configurations includes a cross-polarization configuration between antenna elements of the first array and antenna elements of the second array, and at least one antenna element configuration of the set of multiple antenna element configurations includes a co-polarization configuration between antenna elements of the first array and antenna elements of the second array.

In some aspects, the UE 115-*c* may transmit, to the network entity 105-*b*, third control information including an indication of a capability of the UE 115-*c* to dynamically switch between a co-polarization configuration between antenna elements of the first array and antenna elements of the second array and a cross-polarization configuration between antenna elements of the first array and antenna elements of the second array, where each antenna element of the set of antenna elements is associated with a first polarization layer and a second polarization layer, and where reception of the set of reference signals is in response to the third control information. In some aspects, generating the measurement information includes determining whether a signal strength measurement for a single reference signal for one of the cross-polarization configuration or the co-polarization configuration satisfies a threshold, and the set of reference signals is the single reference signal. In some aspects, generating the measurement information includes generating a first RSRP measurement (or RSRQ, SNR, SINR, or CIR measurement) for a first reference signal for the cross-polarization configuration, and generating a second RSRP measurement (or RSRQ, SNR, SINR, or CIR measurement) for a second reference signal for the co-polarization configuration, and the set of reference signals includes the first reference signal and the second reference signal. In some aspects, the UE 115-*c* may receive, from the network entity 105-*b*, fourth control information including an indication to dynamically switch between the co-polarization configuration and the cross-polarization configuration based on the second control information.

In some aspects, the antenna module includes a third array of antenna elements in a third dimension that is different than the first dimension and the second dimension. In some aspects, the UE 115-*c* may select, based on the set of reference signals (e.g., based on determined channel conditions), two of the first array, the second array, and the third array. The UE 115-*c* may communicate with the network entity 105-*b* via the selected two of the first array, the second array, and the third array. In some aspects, the UE 115-*c* may select, based on the set of reference signals, an antenna element configuration of the antenna elements of the selected two of the first array, the second array, and the third array. In some aspects, transmitting the first control information includes transmitting an indication that the type of the antenna module includes the third array of antenna elements in the third dimension that is different than the first dimension and the second dimension and an indication that the UE 115-*c* is capable of dynamically selecting two of the first array, the second array, and the third array. In some aspects, the third dimension is perpendicular to the first dimension and the second dimension.

Figure 7:
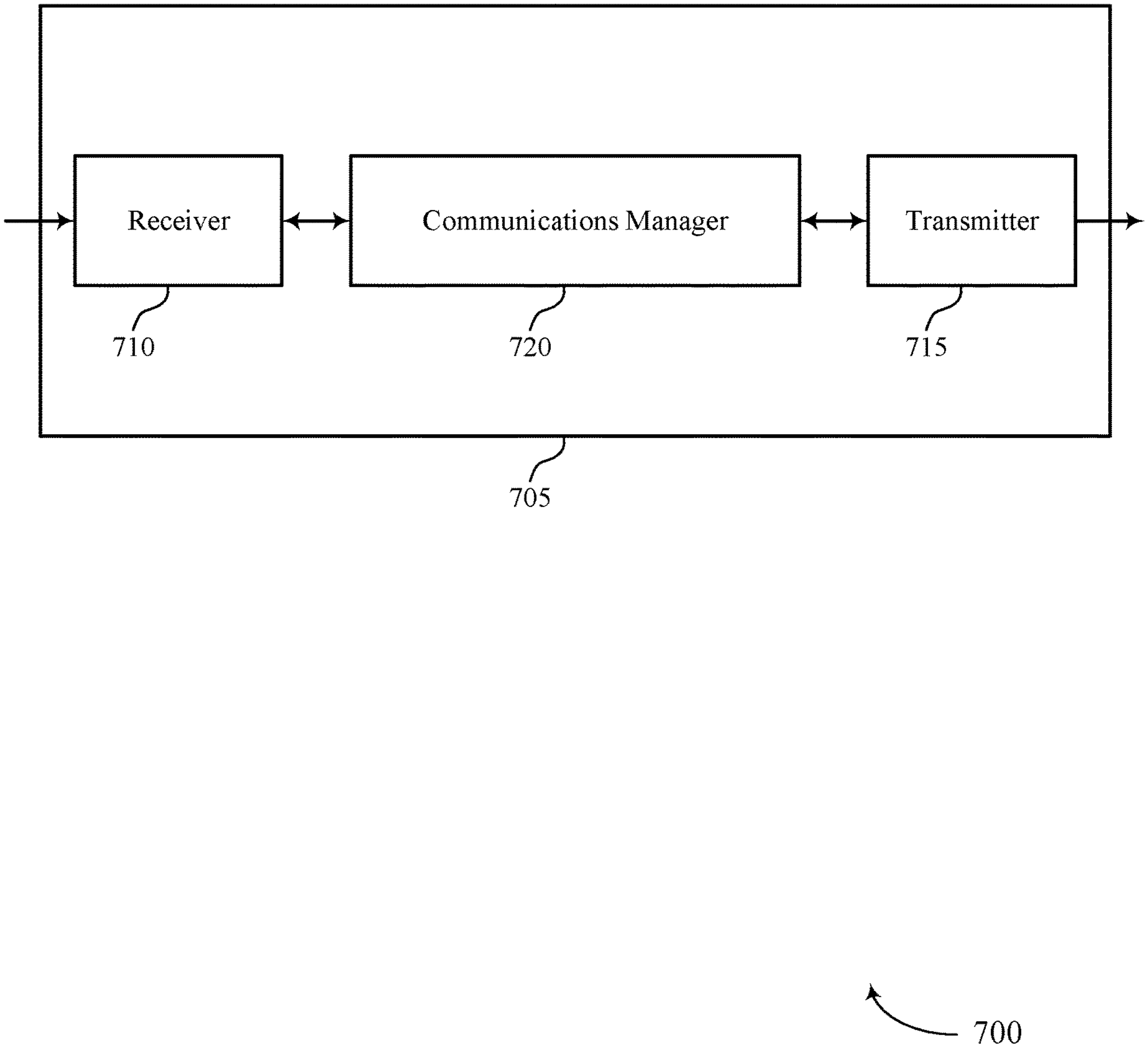
FIGS. 7 and 8 show block diagrams of devices that support selecting antenna elements with an L shaped antenna module in accordance with one or more aspects of the present disclosure.

FIG. 7 shows a block diagram 700 of a device 705 that supports selecting antenna elements with an L shaped antenna module in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to selecting antenna elements with an L shaped antenna module). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to selecting antenna elements with an L shaped antenna module). In some aspects, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of selecting antenna elements with an L shaped antenna module as described herein. For example, the communications manager 720, the receiver 710, the transmitter 715, or various combinations or components thereof may support a method for performing one or more of the functions described herein.

In some aspects, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first network node in accordance with examples as disclosed herein. For example, the communications manager 720 may be configured as or otherwise support a means for transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension. The communications manager 720 may be configured as or otherwise support a means for receiving, from the second network node, scheduling information for a set of reference signals based on the type of the antenna module. The communications manager 720 may be configured as or otherwise support a means for receiving, via the set of antenna elements, the set of reference signals in accordance with the scheduling information. The communications manager 720 may be configured as or otherwise support a means for generating, based on the set of reference signals, measurement information corresponding to a set of multiple antenna element configurations for the set of antenna elements. The communications manager 720 may be configured as or otherwise support a means for transmitting, to the second network node, second control information based on the measurement information.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced power consumption and more efficient utilization of communication resources.

Figure 8:
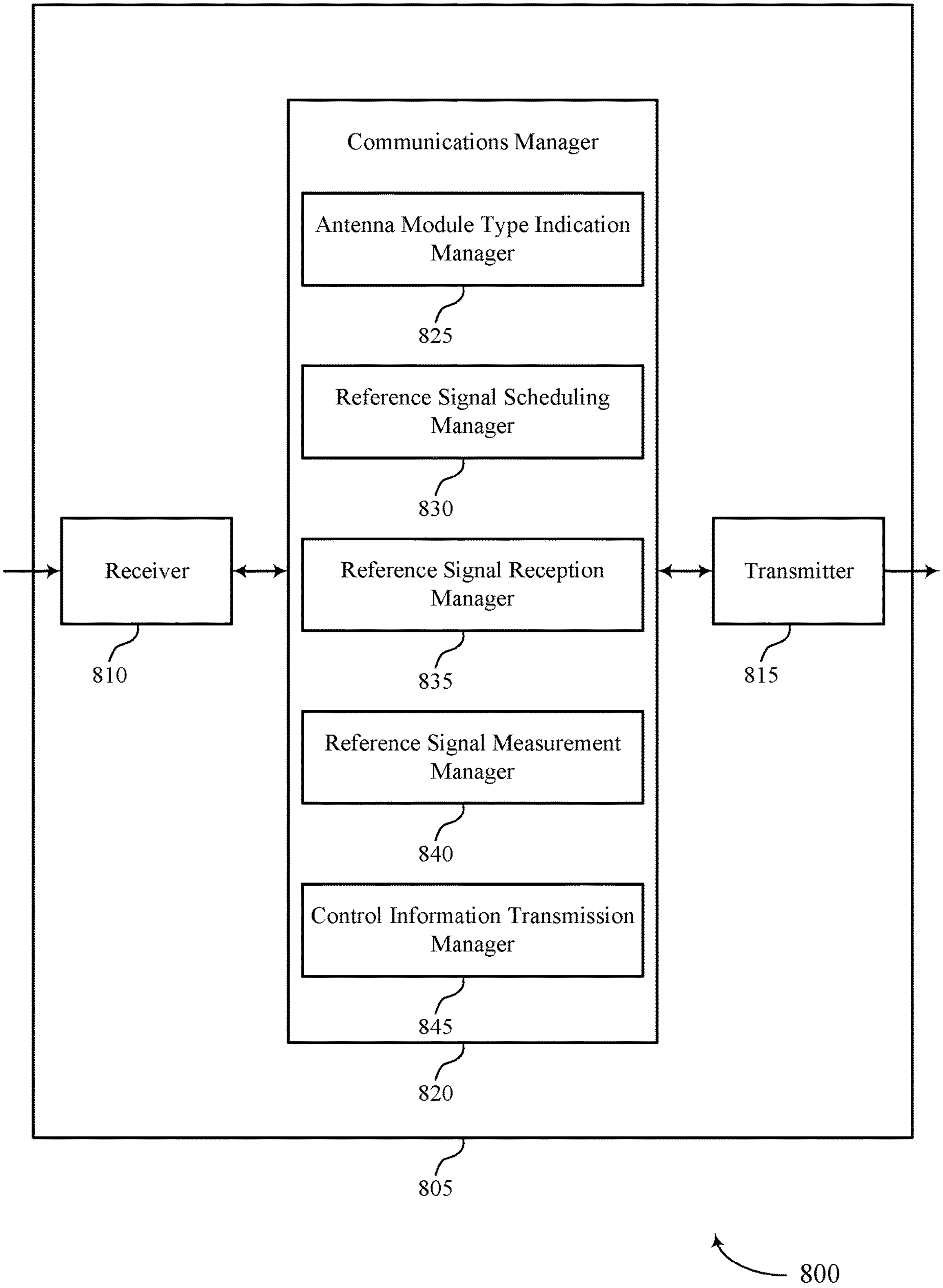

FIG. 8 shows a block diagram 800 of a device 805 that supports selecting antenna elements with an L shaped antenna module in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to selecting antenna elements with an L shaped antenna module). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to selecting antenna elements with an L shaped antenna module). In some aspects, the transmitter 815 may be co-located with a receiver 810 in a transceiver module. The transmitter 815 may utilize a single antenna or a set of multiple antennas.

The device 805, or various components thereof, may be an example of means for performing various aspects of selecting antenna elements with an L shaped antenna module as described herein. For example, the communications manager 820 may include an antenna module type indication manager 825, a reference signal scheduling manager 830, a reference signal reception manager 835, a reference signal measurement manager 840, a control information transmission manager 845, or any combination thereof. The communications manager 820 may be an example of aspects of a communications manager 720 as described herein. In some aspects, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first network node in accordance with examples as disclosed herein. The antenna module type indication manager 825 may be configured as or otherwise support a means for transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension. The reference signal scheduling manager 830 may be configured as or otherwise support a means for receiving, from the second network node, scheduling information for a set of reference signals based on the type of the antenna module. The reference signal reception manager 835 may be configured as or otherwise support a means for receiving, via the set of antenna elements, the set of reference signals in accordance with the scheduling information. The reference signal measurement manager 840 may be configured as or otherwise support a means for generating, based on the set of reference signals, measurement information corresponding to a set of multiple antenna element configurations for the set of antenna elements. The control information transmission manager 845 may be configured as or otherwise support a means for transmitting, to the second network node, second control information based on the measurement information.

Figure 9:
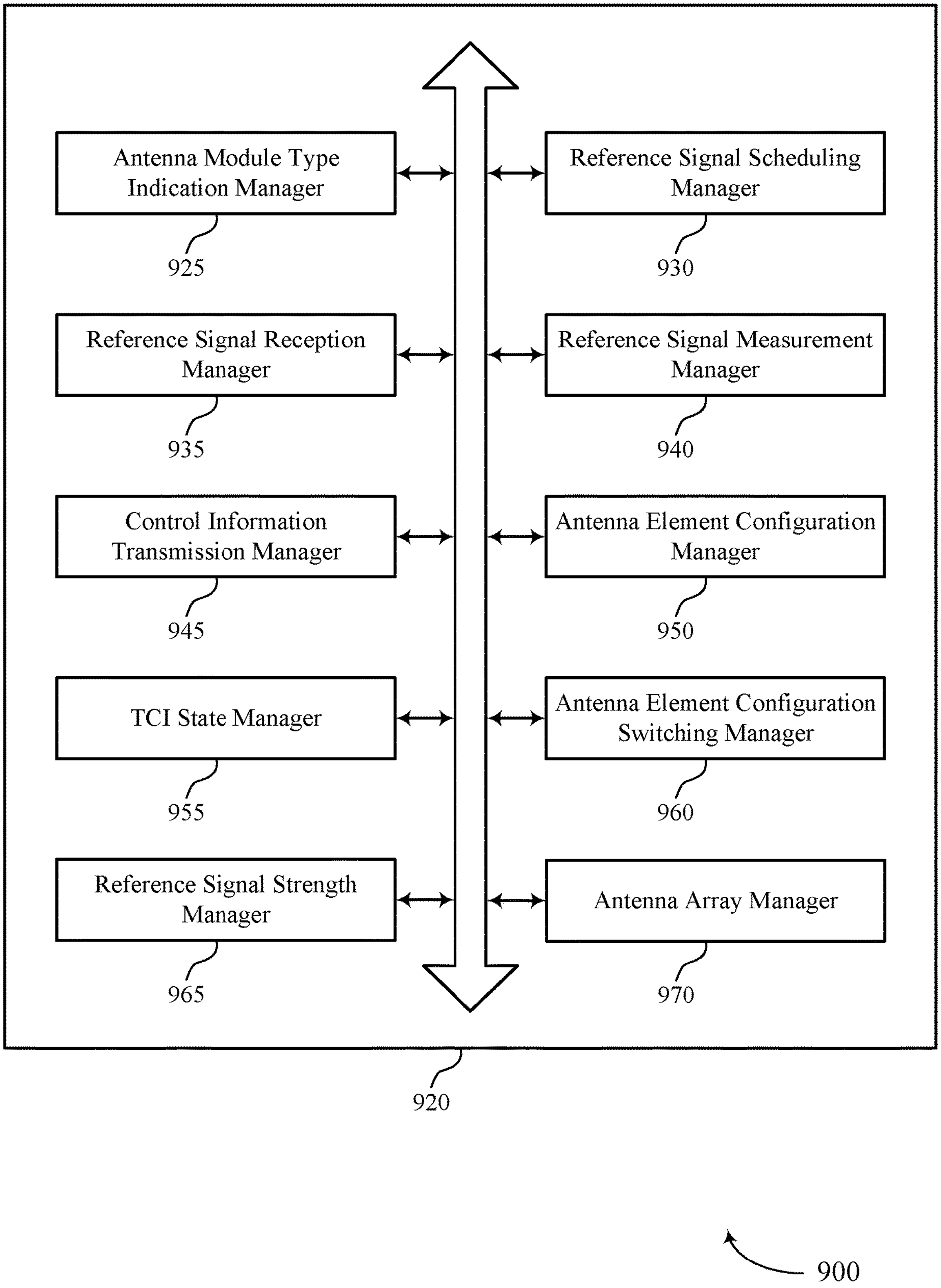
FIG. 9 shows a block diagram of a communications manager that supports selecting antenna elements with an L shaped antenna module in accordance with one or more aspects of the present disclosure.

FIG. 9 shows a block diagram 900 of a communications manager 920 that supports selecting antenna elements with an L shaped antenna module in accordance with one or more aspects of the present disclosure. The communications manager 920 may be an example of aspects of a communications manager 720, a communications manager 820, or both, as described herein. The communications manager 920, or various components thereof, may be an example of means for performing various aspects of selecting antenna elements with an L shaped antenna module as described herein. For example, the communications manager 920 may include an antenna module type indication manager 925, a reference signal scheduling manager 930, a reference signal reception manager 935, a reference signal measurement manager 940, a control information transmission manager 945, an antenna element configuration manager 950, a TCI state manager 955, an antenna element configuration switching manager 960, a reference signal strength manager 965, an antenna array manager 970, or any combination thereof. Each of these components may communicate, directly or indirectly, with one another (e.g., via one or more buses).

The communications manager 920 may support wireless communications at a first network node in accordance with examples as disclosed herein. The antenna module type indication manager 925 may be configured as or otherwise support a means for transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension. The reference signal scheduling manager 930 may be configured as or otherwise support a means for receiving, from the second network node, scheduling information for a set of reference signals based on the type of the antenna module. The reference signal reception manager 935 may be configured as or otherwise support a means for receiving, via the set of antenna elements, the set of reference signals in accordance with the scheduling information. The reference signal measurement manager 940 may be configured as or otherwise support a means for generating, based on the set of reference signals, measurement information corresponding to a set of multiple antenna element configurations for the set of antenna elements. The control information transmission manager 945 may be configured as or otherwise support a means for transmitting, to the second network node, second control information based on the measurement information.

In some aspects, the antenna element configuration manager 950 may be configured as or otherwise support a means for determining, based on the measurement information, a first antenna element configuration of the set of multiple antenna element configurations, where the second control information includes an indication of the first antenna element configuration.

In some aspects, the TCI state manager 955 may be configured as or otherwise support a means for receiving, from the second network node, an indication of a TCI state based on the indication of the first antenna element configuration.

In some aspects, to support generating the measurement information, the reference signal strength manager 965 may be configured as or otherwise support a means for determining a respective signal strength measurement for each antenna element configuration of the set of multiple antenna element configurations, where each of the set of multiple antenna element configurations is associated with a same power consumption level.

In some aspects, the antenna element configuration manager 950 may be configured as or otherwise support a means for receiving, from the second network node, third control information including an indication of an association between each antenna element configuration and a respective TCI state, and where the indication of the first antenna element configuration includes an indication of the respective TCI state associated with the first antenna element configuration.

In some aspects, to support generating the measurement information, the reference signal reception manager 935 may be configured as or otherwise support a means for determining a respective RSRP measurement for each antenna element configuration of the set of multiple antenna element configurations, where the second control information includes an indication of the respective RSRP measurements.

In some aspects, the TCI state manager 955 may be configured as or otherwise support a means for receiving, from the second network node, an indication of a TCI state based on the second control information.

In some aspects, each antenna element of the set of antenna elements is associated with a first polarization layer and a second polarization layer. In some aspects, at least one antenna element configuration of the set of multiple antenna element configurations includes a cross-polarization configuration between antenna elements of the first array and antenna elements of the second array. In some aspects, at least one antenna element configuration of the set of multiple antenna element configurations includes a co-polarization configuration between antenna elements of the first array and antenna elements of the second array.

In some aspects, the antenna element configuration switching manager 960 may be configured as or otherwise support a means for transmitting, to the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, where each antenna element of the set of antenna elements is associated with a first polarization layer and a second polarization layer, where reception of the set of reference signals is in response to the third control information.

In some aspects, to support generating the measurement information, the reference signal strength manager 965 may be configured as or otherwise support a means for determining whether a signal strength measurement for a single reference signal for one of the cross-polarization configuration or the co-polarization configuration satisfies a threshold, where the set of reference signals includes the single reference signal.

In some aspects, to support generating the measurement information, the reference signal strength manager 965 may be configured as or otherwise support a means for generating a first RSRP measurement for a first reference signal for the cross-polarization configuration. In some aspects, to support generating the measurement information, the reference signal strength manager 965 may be configured as or otherwise support a means for generate a second RSRP measurement for a second reference signal for the co-polarization configuration, where the set of reference signals includes the first reference signal and the second reference signal.

In some aspects, the antenna element configuration switching manager 960 may be configured as or otherwise support a means for receiving, from the second network node, fourth control information including an indication to dynamically switch between the co-polarization configuration and the cross-polarization configuration based on the second control information.

In some aspects, the first dimension is perpendicular to the second dimension.

In some examples, the antenna module includes a third array of antenna elements in a third dimension that is different than the first dimension and the second dimension.

In some examples, the antenna array manager 970 may be configured as or otherwise support a means for selecting, based on the set of reference signals, two of the first array, the second array, and the third array. In some examples, the antenna array manager 970 may be configured as or otherwise support a means for communicating with the second network node via the selected two of the first array, the second array, and the third array.

In some examples, the antenna element configuration switching manager 960 may be configured as or otherwise support a means for selecting, based on the set of reference signals, an antenna element configuration of the antenna elements of the selected two of the first array, the second array, and the third array.

In some examples, to support transmitting the first control information, the antenna module type indication manager 925 may be configured as or otherwise support a means for transmitting the first control information including an indication that the type of the antenna module includes the third array of antenna elements in the third dimension that is different than the first dimension and the second dimension and an indication that the first network node is capable of dynamically selecting two of the first array, the second array, and the third array.

In some examples, the third dimension is perpendicular to the first dimension and the second dimension.

Figure 10:
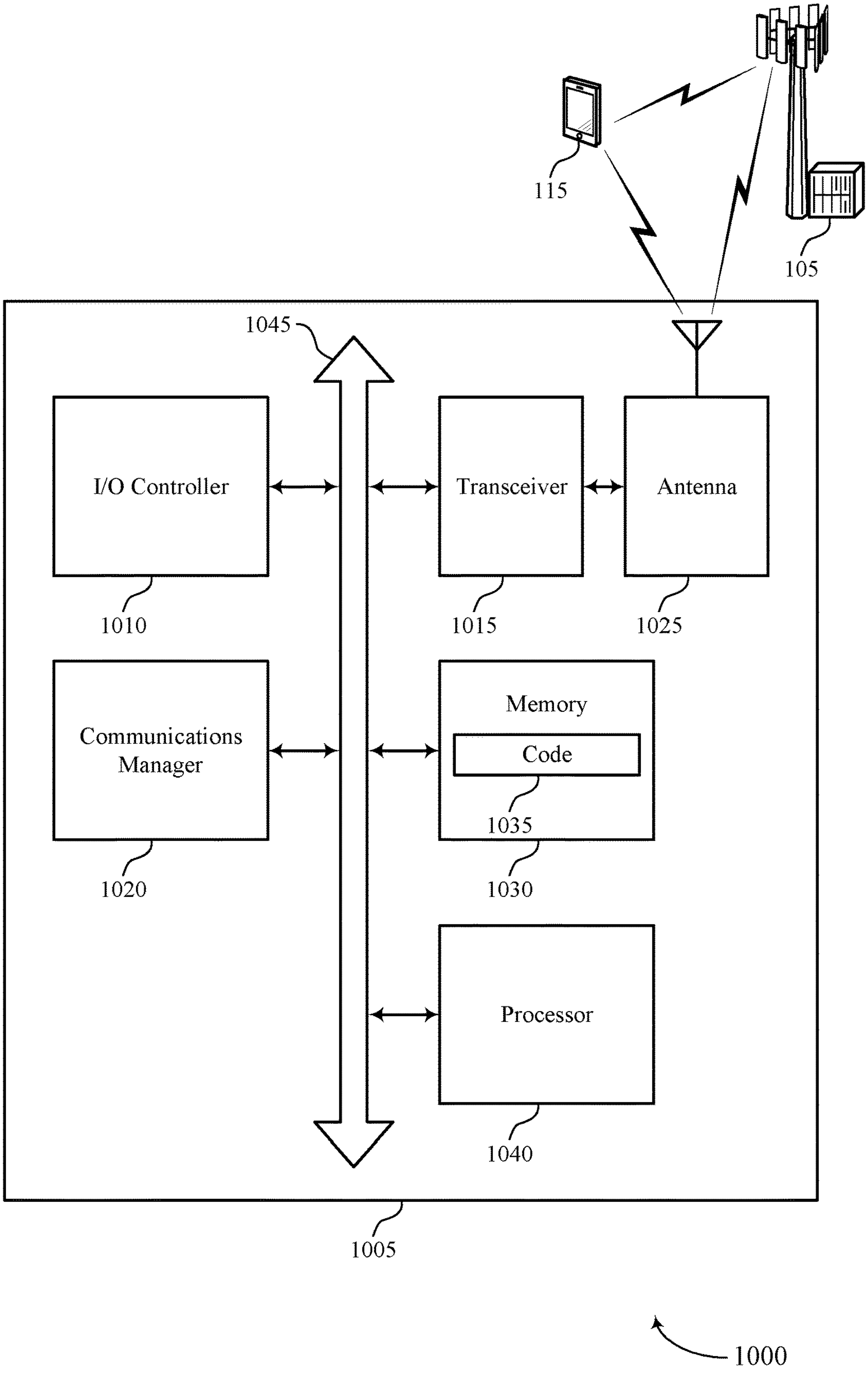
FIG. 10 shows a diagram of a system including a device that supports selecting antenna elements with an L shaped antenna module in accordance with one or more aspects of the present disclosure.

FIG. 10 shows a diagram of a system 1000 including a device 1005 that supports selecting antenna elements with an L shaped antenna module in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting selecting antenna elements with an L shaped antenna module). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first network node in accordance with examples as disclosed herein. For example, the communications manager 1020 may be configured as or otherwise support a means for transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension. The communications manager 1020 may be configured as or otherwise support a means for receiving, from the second network node, scheduling information for a set of reference signals based on the type of the antenna module. The communications manager 1020 may be configured as or otherwise support a means for receiving, via the set of antenna elements, the set of reference signals in accordance with the scheduling information. The communications manager 1020 may be configured as or otherwise support a means for generating, based on the set of reference signals, measurement information corresponding to a set of multiple antenna element configurations for the set of antenna elements. The communications manager 1020 may be configured as or otherwise support a means for transmitting, to the second network node, second control information based on the measurement information.

By including or configuring the communications manager 1020 in accordance with examples as described herein, the device 1005 may support techniques for reduced power consumption, more efficient utilization of communication resources, and improved coordination between devices.

In some aspects, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some aspects, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of selecting antenna elements with an L shaped antenna module as described herein, or the processor 1040 and the memory 1030 may be otherwise configured to perform or support such operations.

Figure 11:
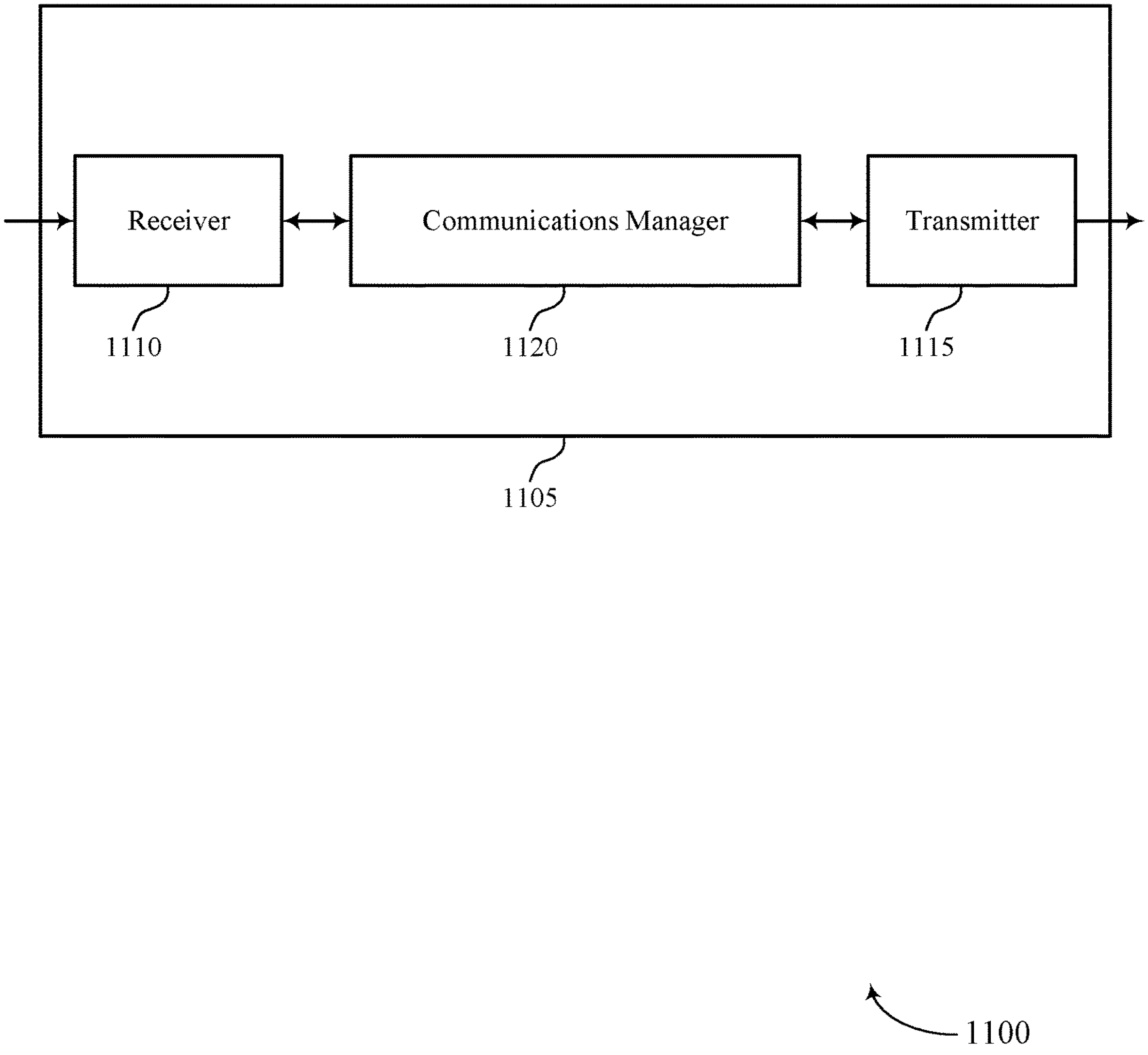
FIGS. 11 and 12 show block diagrams of devices that support selecting antenna elements with an L shaped antenna module in accordance with one or more aspects of the present disclosure.

FIG. 11 shows a block diagram 1100 of a device 1105 that supports selecting antenna elements with an L shaped antenna module in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some aspects, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some aspects, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of selecting antenna elements with an L shaped antenna module as described herein. For example, the communications manager 1120, the receiver 1110, the transmitter 1115, or various combinations or components thereof may support a method for performing one or more of the functions described herein.

In some aspects, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first network node in accordance with examples as disclosed herein. For example, the communications manager 1120 may be configured as or otherwise support a means for receiving, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension. The communications manager 1120 may be configured as or otherwise support a means for transmitting, to the second network node, scheduling information for a set of reference signals based on the type of the antenna module. The communications manager 1120 may be configured as or otherwise support a means for transmitting, to the second network node, the set of reference signals in accordance with the scheduling information. The communications manager 1120 may be configured as or otherwise support a means for receiving, from the second network node, second control information based on measurement information associated with the type of the antenna module at the second network node for the set of reference signals.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced power consumption and more efficient utilization of communication resources.

Figure 12:
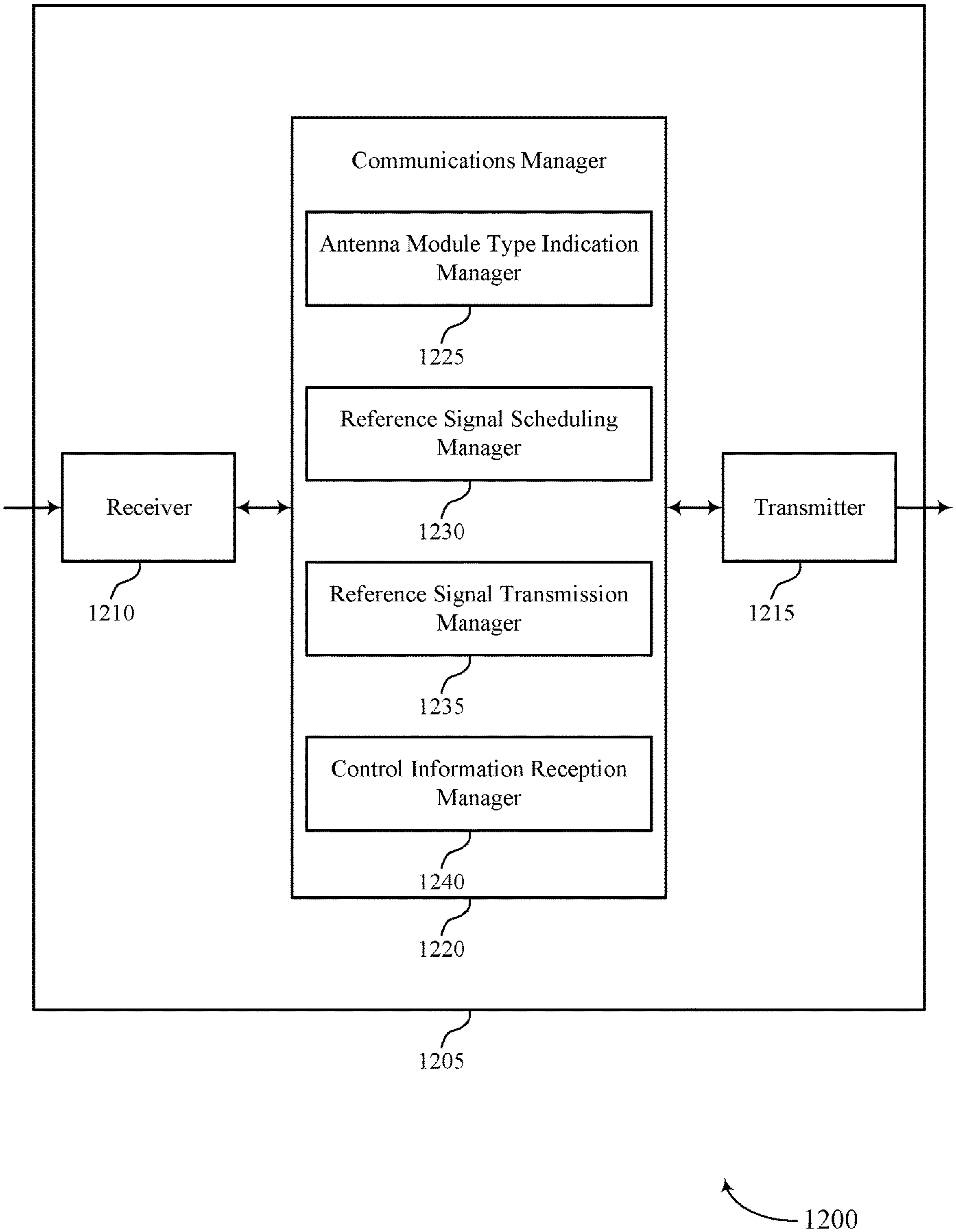

FIG. 12 shows a block diagram 1200 of a device 1205 that supports selecting antenna elements with an L shaped antenna module in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some aspects, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some aspects, the transmitter 1215 and the receiver 1210 may be co-located in a transceiver, which may include or be coupled with a modem.

The device 1205, or various components thereof, may be an example of means for performing various aspects of selecting antenna elements with an L shaped antenna module as described herein. For example, the communications manager 1220 may include an antenna module type indication manager 1225, a reference signal scheduling manager 1230, a reference signal transmission manager 1235, a control information reception manager 1240, or any combination thereof. The communications manager 1220 may be an example of aspects of a communications manager 1120 as described herein. In some aspects, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a first network node in accordance with examples as disclosed herein. The antenna module type indication manager 1225 may be configured as or otherwise support a means for receiving, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension. The reference signal scheduling manager 1230 may be configured as or otherwise support a means for transmitting, to the second network node, scheduling information for a set of reference signals based on the type of the antenna module. The reference signal transmission manager 1235 may be configured as or otherwise support a means for transmitting, to the second network node, the set of reference signals in accordance with the scheduling information. The control information reception manager 1240 may be configured as or otherwise support a means for receiving, from the second network node, second control information based on measurement information associated with the type of the antenna module at the second network node for the set of reference signals.

Figure 13:
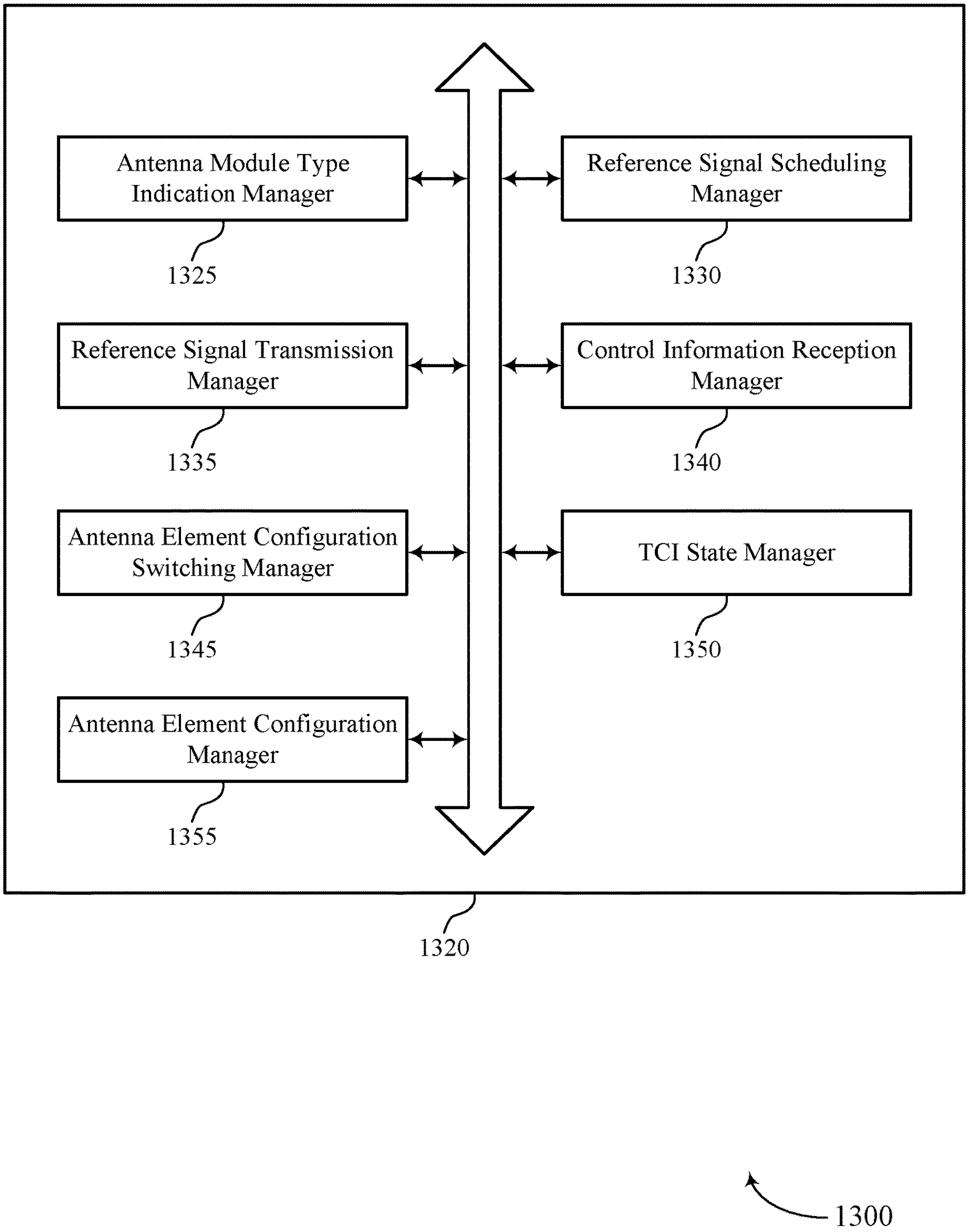
FIG. 13 shows a block diagram of a communications manager that supports selecting antenna elements with an L shaped antenna module in accordance with one or more aspects of the present disclosure.

FIG. 13 shows a block diagram 1300 of a communications manager 1320 that supports selecting antenna elements with an L shaped antenna module in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of selecting antenna elements with an L shaped antenna module as described herein. For example, the communications manager 1320 may include an antenna module type indication manager 1325, a reference signal scheduling manager 1330, a reference signal transmission manager 1335, a control information reception manager 1340, an antenna element configuration switching manager 1345, a TCI state manager 1350, an antenna element configuration manager 1355, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a first network node in accordance with examples as disclosed herein. The antenna module type indication manager 1325 may be configured as or otherwise support a means for receiving, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension. The reference signal scheduling manager 1330 may be configured as or otherwise support a means for transmitting, to the second network node, scheduling information for a set of reference signals based on the type of the antenna module. The reference signal transmission manager 1335 may be configured as or otherwise support a means for transmitting, to the second network node, the set of reference signals in accordance with the scheduling information. The control information reception manager 1340 may be configured as or otherwise support a means for receiving, from the second network node, second control information based on measurement information associated with the type of the antenna module at the second network node for the set of reference signals.

In some aspects, the second control information includes an indication of a first antenna element configuration for the set of antenna elements.

In some aspects, the TCI state manager 1350 may be configured as or otherwise support a means for transmitting, to the second network node, an indication of a TCI state based on the indication of the first antenna element configuration.

In some aspects, the antenna element configuration manager 1355 may be configured as or otherwise support a means for transmitting, to the second network node, third control information including an indication of an association between each antenna element configuration of a set of multiple antenna element configurations and a respective TCI state, where the set of multiple antenna element configurations includes the first antenna element configuration, and where the indication of the first antenna element configuration includes an indication of the respective TCI state associated with the first antenna element configuration.

In some aspects, the second control information includes an indication of respective RSRP measurements associated with a set of multiple antenna element configurations for the set of antenna elements.

In some aspects, the TCI state manager 1350 may be configured as or otherwise support a means for transmitting, to the second network node, an indication of a TCI state based on the second control information.

In some aspects, the antenna element configuration switching manager 1345 may be configured as or otherwise support a means for receiving, from the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, where each antenna element of the set of antenna elements is associated with a first polarization layer and a second polarization layer, and where transmission of the set of reference signals is in response to the third control information.

In some aspects, the set of reference signals includes a single reference signal. In some aspects, the second control information includes an indication of one or the co-polarization configuration or the cross-polarization configuration.

In some aspects, the set of reference signals includes a first reference signal and a second reference signal. In some aspects, the second control information includes an indication of one or the co-polarization configuration or the cross-polarization configuration.

In some aspects, the first control information further indicates that the first dimension is perpendicular to the second dimension.

In some examples, to support receiving the first control information, the antenna module type indication manager 1325 may be configured as or otherwise support a means for receiving the first control information including an indication that the type of the antenna module includes a third array of antenna elements in a third dimension that is different than the first dimension and the second dimension and an indication that the first network node is capable of dynamically selecting two of the first array, the second array, and the third array.

Figure 14:
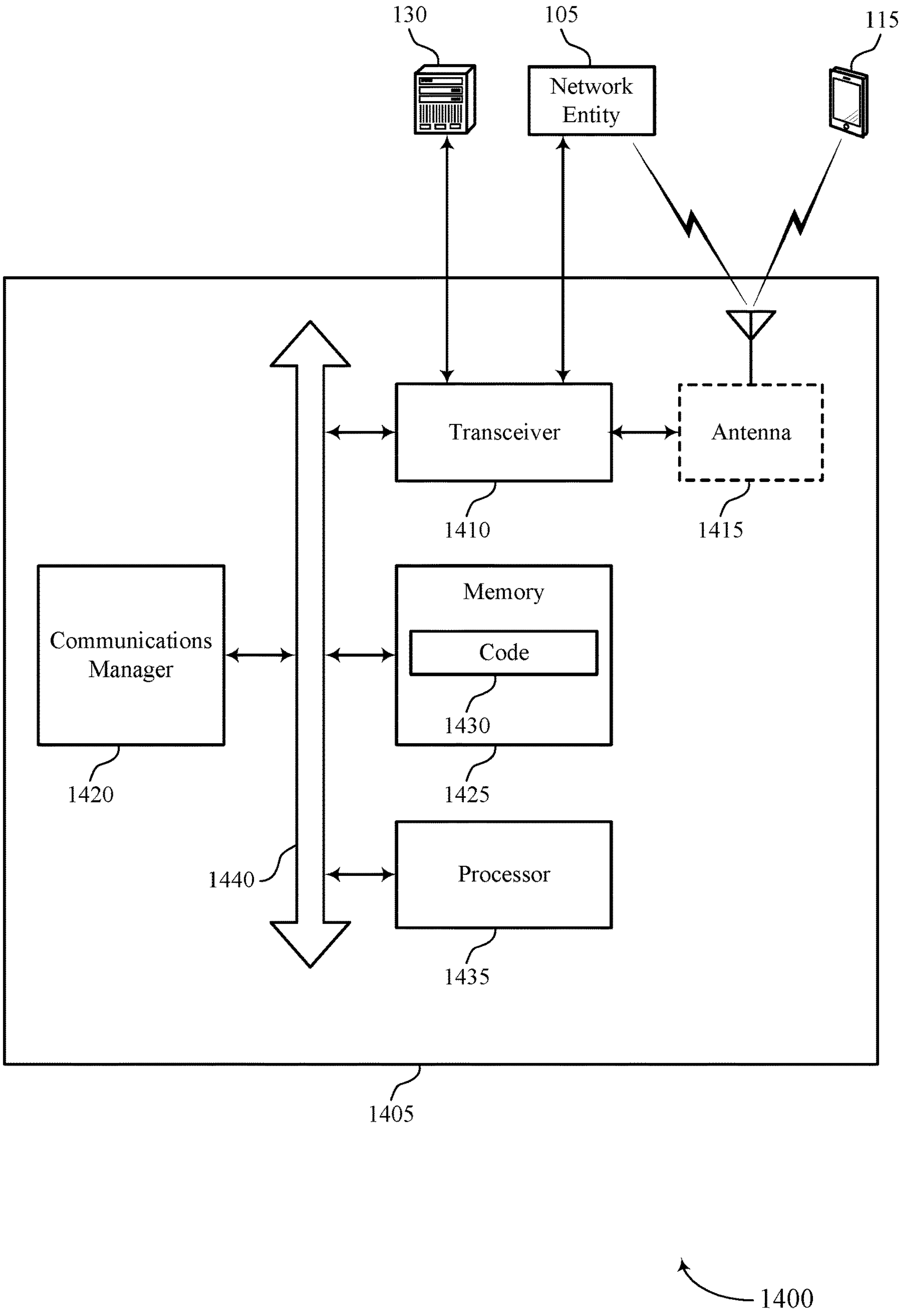
FIG. 14 shows a diagram of a system including a device that supports selecting antenna elements with an L shaped antenna module in accordance with one or more aspects of the present disclosure.

FIG. 14 shows a diagram of a system 1400 including a device 1405 that supports selecting antenna elements with an L shaped antenna module in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some aspects, the transceiver 1410 may include a wired transceiver and may communicate bi-directionally with another wired transceiver. Additionally, or alternatively, in some aspects, the transceiver 1410 may include a wireless transceiver and may communicate bi-directionally with another wireless transceiver. In some aspects, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some aspects, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting selecting antenna elements with an L shaped antenna module). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1440 may support communications of (e.g., within) a protocol layer of a protocol stack. In some aspects, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some aspects, the communications manager 1420 may manage aspects of communications with a core network 130 (e.g., via one or more wired or wireless backhaul links). For example, the communications manager 1420 may manage the transfer of data communications for client devices, such as one or more UEs 115. In some aspects, the communications manager 1420 may manage communications with other network entities 105, and may include a controller or scheduler for controlling communications with UEs 115 in cooperation with other network entities 105. In some aspects, the communications manager 1420 may support an X2 interface within an LTE/LTE-A wireless communications network technology to provide communication between network entities 105.

The communications manager 1420 may support wireless communications at a first network node in accordance with examples as disclosed herein. For example, the communications manager 1420 may be configured as or otherwise support a means for receiving, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension. The communications manager 1420 may be configured as or otherwise support a means for transmitting, to the second network node, scheduling information for a set of reference signals based on the type of the antenna module. The communications manager 1420 may be configured as or otherwise support a means for transmitting, to the second network node, the set of reference signals in accordance with the scheduling information. The communications manager 1420 may be configured as or otherwise support a means for receiving, from the second network node, second control information based on measurement information associated with the type of the antenna module at the second network node for the set of reference signals.

By including or configuring the communications manager 1420 in accordance with examples as described herein, the device 1405 may support techniques for reduced power consumption, more efficient utilization of communication resources, and improved coordination between devices.

In some aspects, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some aspects, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of selecting antenna elements with an L shaped antenna module as described herein, or the processor 1435 and the memory 1425 may be otherwise configured to perform or support such operations.

Figure 15:
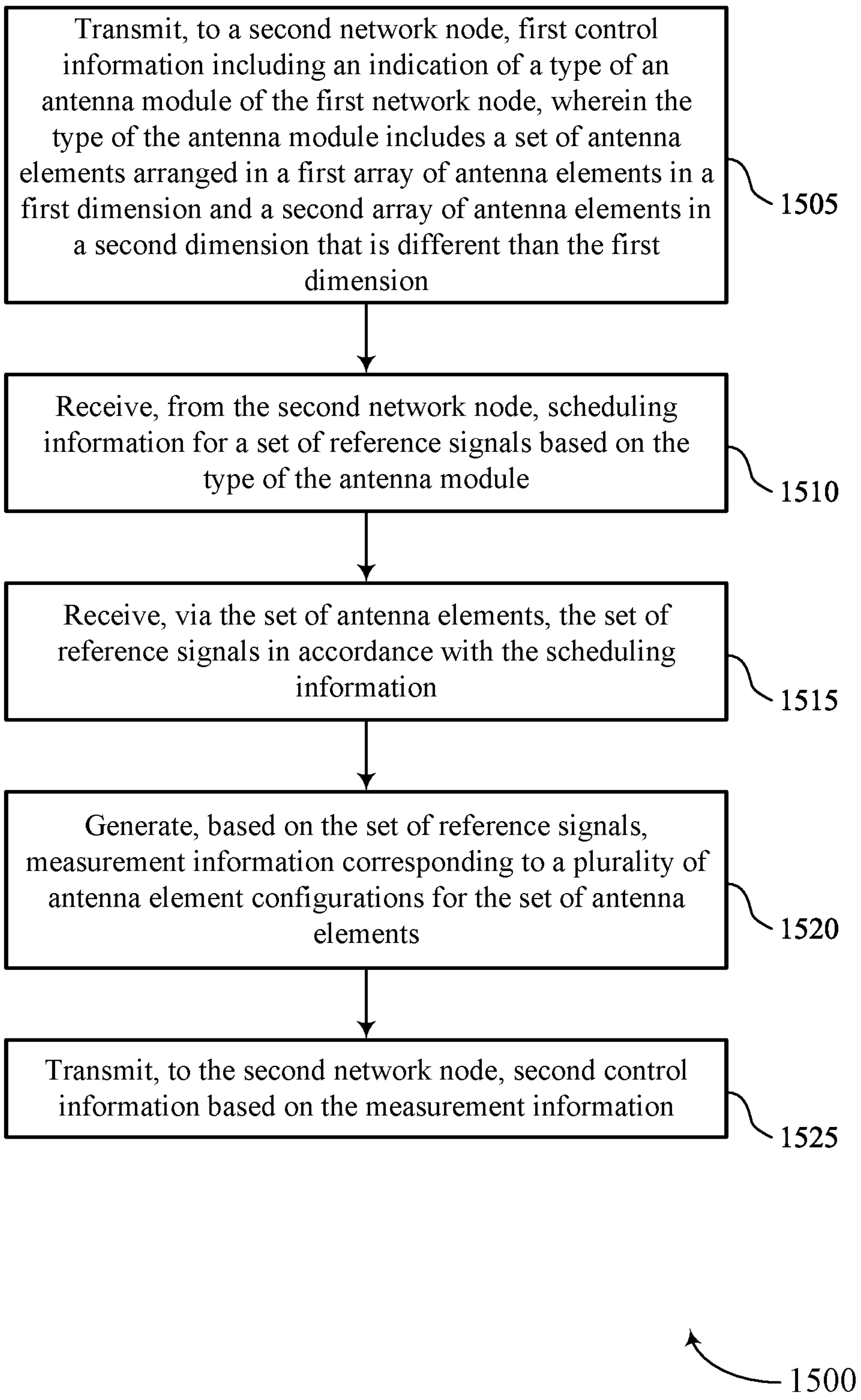
FIGS. 15 through 17 show flowcharts illustrating methods that support selecting antenna elements with an L shaped antenna module in accordance with one or more aspects of the present disclosure.

FIG. 15 shows a flowchart illustrating a method 1500 that supports selecting antenna elements with an L shaped antenna module in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some aspects, a UE may execute a set of instructions to control the functional elements of the UE to perform the described functions. Additionally, or alternatively, the UE may perform aspects of the described functions using special-purpose hardware.

At 1505, the method may include transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension. The operations of 1505 may be performed in accordance with examples as disclosed herein. In some aspects, aspects of the operations of 1505 may be performed by an antenna module type indication manager 925 as described with reference to FIG. 9.

At 1510, the method may include receiving, from the second network node, scheduling information for a set of reference signals based on the type of the antenna module. The operations of 1510 may be performed in accordance with examples as disclosed herein. In some aspects, aspects of the operations of 1510 may be performed by a reference signal scheduling manager 930 as described with reference to FIG. 9.

At 1515, the method may include receiving, via the set of antenna elements, the set of reference signals in accordance with the scheduling information. The operations of 1515 may be performed in accordance with examples as disclosed herein. In some aspects, aspects of the operations of 1515 may be performed by a reference signal reception manager 935 as described with reference to FIG. 9.

At 1520, the method may include generating, based on the set of reference signals, measurement information corresponding to a set of multiple antenna element configurations for the set of antenna elements. The operations of 1520 may be performed in accordance with examples as disclosed herein. In some aspects, aspects of the operations of 1520 may be performed by a reference signal measurement manager 940 as described with reference to FIG. 9.

At 1525, the method may include transmitting, to the second network node, second control information based on the measurement information. The operations of 1525 may be performed in accordance with examples as disclosed herein. In some aspects, aspects of the operations of 1525 may be performed by a control information transmission manager 945 as described with reference to FIG. 9.

Figure 16:
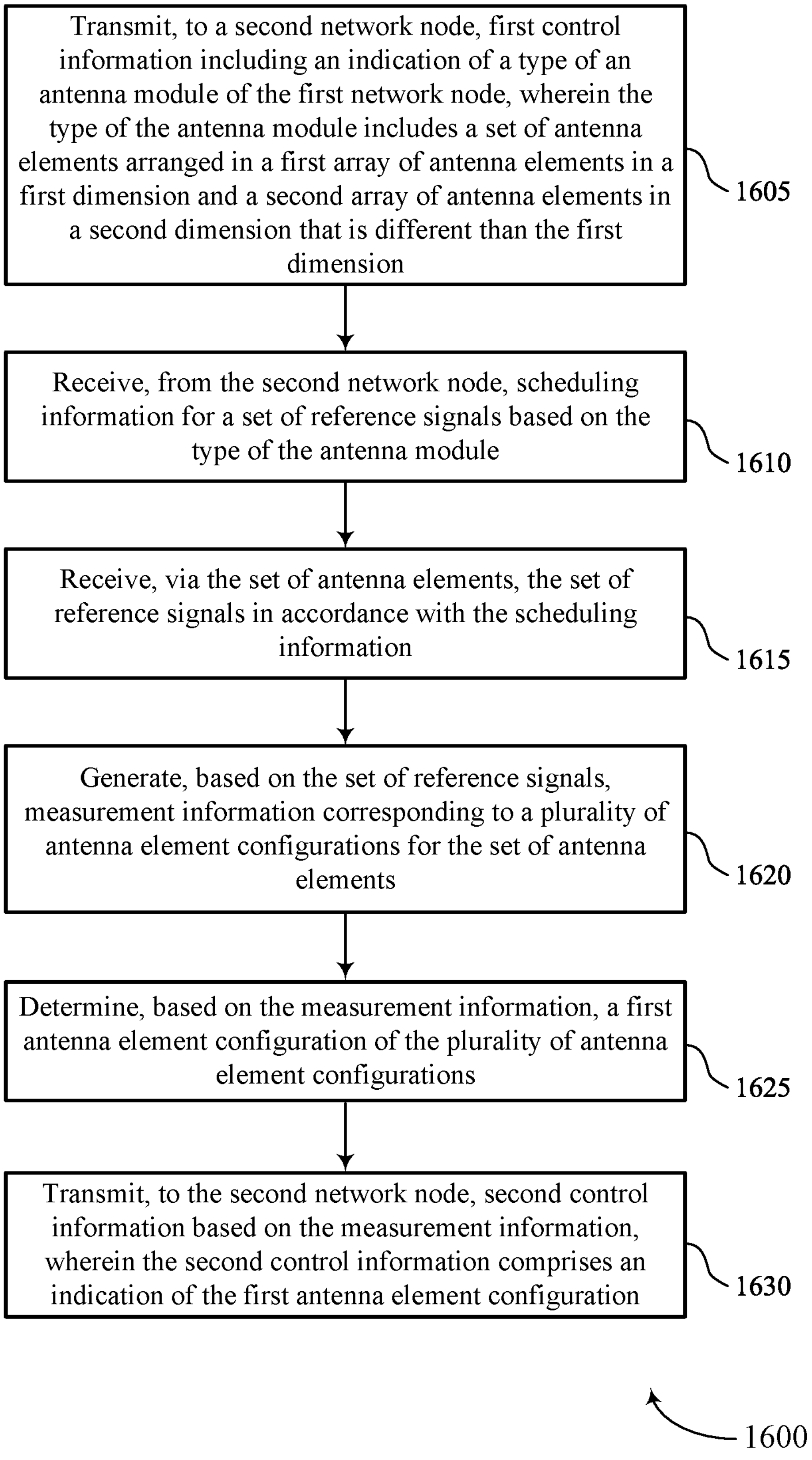

FIG. 16 shows a flowchart illustrating a method 1600 that supports selecting antenna elements with an L shaped antenna module in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some aspects, a UE may execute a set of instructions to control the functional elements of the UE to perform the described functions. Additionally, or alternatively, the UE may perform aspects of the described functions using special-purpose hardware.

At 1605, the method may include transmitting, to a second network node, first control information including an indication of a type of an antenna module of the first network node, where the type of the antenna module includes a set of antenna elements arranged in a first array of antenna elements in a first dimension and a second array of antenna elements in a second dimension that is different than the first dimension. The operations of 1605 may be performed in accordance with examples as disclosed herein. In some aspects, aspects of the operations of 1605 may be performed by an antenna module type indication manager 925 as described with reference to FIG. 9.

At 1610, the method may include receiving, from the second network node, scheduling information for a set of reference signals based on the type of the antenna module. The operations of 1610 may be performed in accordance with examples as disclosed herein. In some aspects, aspects of the operations of 1610 may be performed by a reference signal scheduling manager 930 as described with reference to FIG. 9.

At 1615, the method may include receiving, via the set of antenna elements, the set of reference signals in accordance with the scheduling information. The operations of 1615 may be performed in accordance with examples as disclosed herein. In some aspects, aspects of the operations of 1615 may be performed by a reference signal reception manager 935 as described with reference to FIG. 9.

At 1620, the method may include generating, based on the set of reference signals, measurement information corresponding to a set of multiple antenna element configurations for the set of antenna elements. The operations of 1620 may be performed in accordance with examples as disclosed herein. In some aspects, aspects of the operations of 1620 may be performed by a reference signal measurement manager 940 as described with reference to FIG. 9.

At 1625, the method may include determining, based on the measurement information, a first antenna element configuration of the set of multiple antenna element configurations. The operations of 1625 may be performed in accordance with examples as disclosed herein. In some aspects, aspects of the operations of 1625 may be performed by an antenna element configuration manager 950 as described with reference to FIG. 9.

At 1630, the method may include transmitting, to the second network node, second control information based on the measurement information, where the second control information includes an indication of the first antenna element configuration. The operations of 1630 may be performed in accordance with examples as disclosed herein. In some aspects, aspects of the operations of 1630 may be performed by a control information transmission manager 945 as described with reference to FIG. 9.

Figure 17:
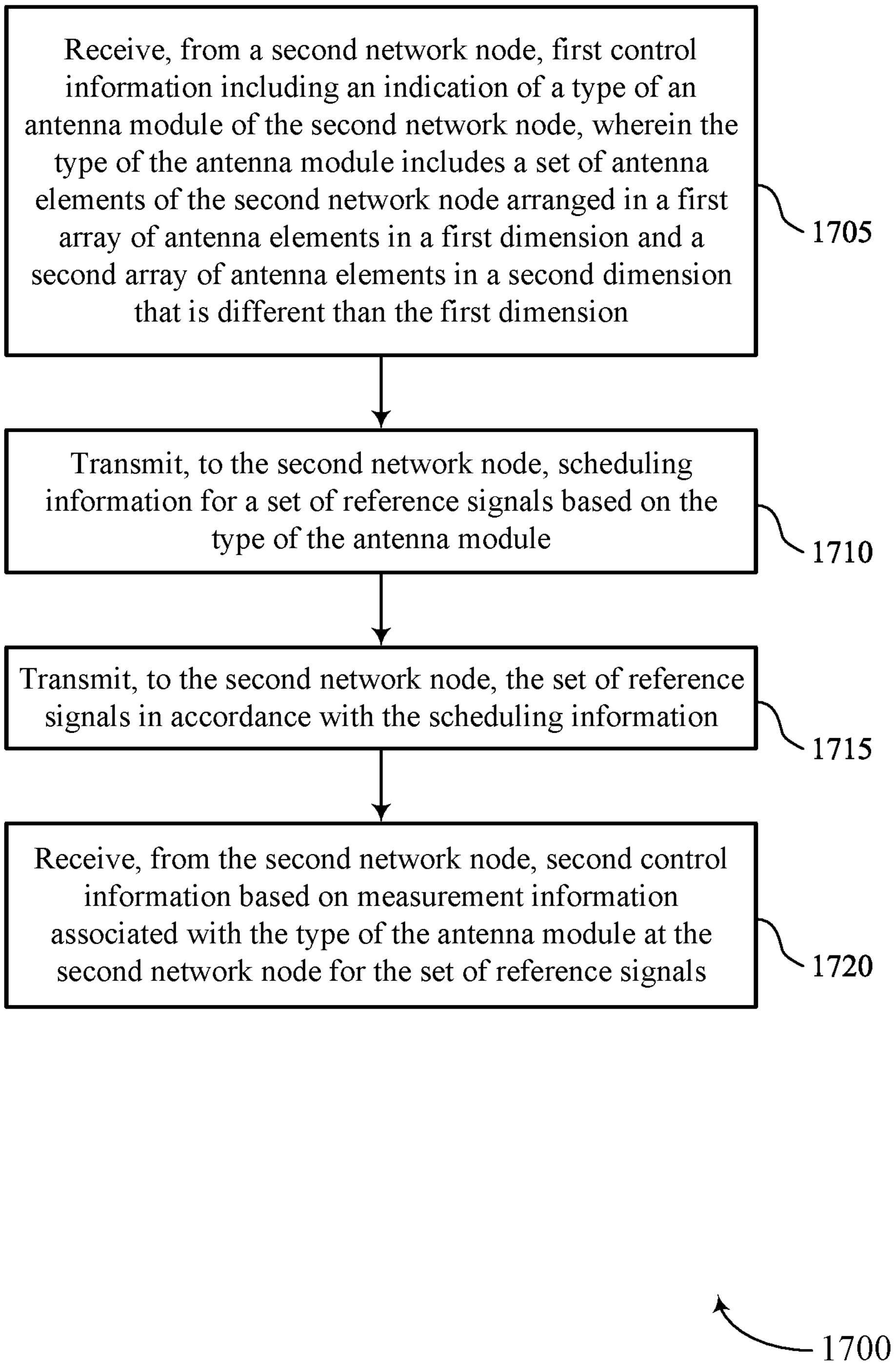

FIG. 17 shows a flowchart illustrating a method 1700 that supports selecting antenna elements with an L shaped antenna module in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some aspects, a network entity may execute a set of instructions to control the functional elements of the network entity to perform the described functions. Additionally, or alternatively, the network entity may perform aspects of the described functions using special-purpose hardware.

At 1705, the method may include receiving, from a second network node, first control information including an indication of a type of an antenna module of the second network node, where the type of the antenna module includes a set of antenna elements of the second network node arranged in a first array of antenna elements in a first dimension and a second array of antenna elements in a second dimension that is different than the first dimension. The operations of 1705 may be performed in accordance with examples as disclosed herein. In some aspects, aspects of the operations of 1705 may be performed by an antenna module type indication manager 1325 as described with reference to FIG. 13.

At 1710, the method may include transmitting, to the second network node, scheduling information for a set of reference signals based on the type of the antenna module. The operations of 1710 may be performed in accordance with examples as disclosed herein. In some aspects, aspects of the operations of 1710 may be performed by a reference signal scheduling manager 1330 as described with reference to FIG. 13.

At 1715, the method may include transmitting, to the second network node, the set of reference signals in accordance with the scheduling information. The operations of 1715 may be performed in accordance with examples as disclosed herein. In some aspects, aspects of the operations of 1715 may be performed by a reference signal transmission manager 1335 as described with reference to FIG. 13.

At 1720, the method may include receiving, from the second network node, second control information based on measurement information associated with the type of the antenna module at the second network node for the set of reference signals. The operations of 1720 may be performed in accordance with examples as disclosed herein. In some aspects, aspects of the operations of 1720 may be performed by a control information reception manager 1340 as described with reference to FIG. 13.

The following provides an overview of aspects of the present disclosure:

Aspect 1: A method for wireless communications at a first network node, comprising: transmitting, to a second network node, first control information including an indication of a type of an antenna module of the first network node, wherein the type of the antenna module includes a set of antenna elements arranged in a first array of antenna elements in a first dimension and a second array of antenna elements in a second dimension that is different than the first dimension; receiving, from the second network node, scheduling information for a set of reference signals based on the type of the antenna module; receiving, via the set of antenna elements, the set of reference signals in accordance with the scheduling information; generating, based on the set of reference signals, measurement information corresponding to a plurality of antenna element configurations for the set of antenna elements; and transmitting, to the second network node, second control information based on the measurement information.

Aspect 2: The method of aspect 1, further comprising: determining, based on the measurement information, a first antenna element configuration of the plurality of antenna element configurations, wherein the second control information comprises an indication of the first antenna element configuration.

Aspect 3: The method of aspect 2, further comprising: receiving, from the second network node, an indication of a transmission configuration indicator (TCI) state based on the indication of the first antenna element configuration.

Aspect 4: The method of any of aspects 2 through 3, wherein generating the measurement information comprises: determining a respective signal strength measurement for each antenna element configuration of the plurality of antenna element configurations, wherein each of the plurality of antenna element configurations is associated with a same power consumption level.

Aspect 5: The method of aspect 4, further comprising: receiving, from the second network node, third control information including an indication of an association between each antenna element configuration and a respective TCI state, and wherein the indication of the first antenna element configuration comprises an indication of the respective TCI state associated with the first antenna element configuration.

Aspect 6: The method of any of aspects 1 through 5, wherein generating the measurement information comprises: determining a respective RSRP measurement for each antenna element configuration of the plurality of antenna element configurations, wherein the second control information includes an indication of the respective RSRP measurements.

Aspect 7: The method of any of aspects 1 through 6, further comprising: receiving, from the second network node, an indication of a TCI state based on the second control information.

Aspect 8: The method of any of aspects 1 through 7, wherein each antenna element of the set of antenna elements is associated with a first polarization layer and a second polarization layer, at least one antenna element configuration of the plurality of antenna element configurations comprises a cross-polarization configuration between antenna elements of the first array and antenna elements of the second array, and at least one antenna element configuration of the plurality of antenna element configurations comprises a co-polarization configuration between antenna elements of the first array and antenna elements of the second array.

Aspect 9: The method of any of aspects 1 through 8, further comprising: transmitting, to the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, wherein each antenna element of the set of antenna elements is associated with a first polarization layer and a second polarization layer, wherein reception of the set of reference signals is in response to the third control information.

Aspect 10: The method of aspect 9, wherein generating the measurement information comprises: determining whether a signal strength measurement for a single reference signal for one of the cross-polarization configuration or the co-polarization configuration satisfies a threshold, wherein the set of reference signals comprises the single reference signal.

Aspect 11: The method of any of aspects 9 through 10, wherein generating the measurement information comprises: generating a first RSRP measurement for a first reference signal for the cross-polarization configuration; and generate a second RSRP measurement for a second reference signal for the co-polarization configuration, wherein the set of reference signals comprises the first reference signal and the second reference signal.

Aspect 12: The method of any of aspects 9 through 11, further comprising: receiving, from the second network node, fourth control information including an indication to dynamically switch between the co-polarization configuration and the cross-polarization configuration based on the second control information.

Aspect 13: The method of any of aspects 1 through 12, wherein the first dimension is perpendicular to the second dimension.

Aspect 14: The method of any of aspects 1 through 13, wherein the antenna module includes a third array of antenna elements in a third dimension that is different than the first dimension and the second dimension.

Aspect 15: The method of aspect 14, further comprising: selecting, based on the set of reference signals, two of the first array, the second array, and the third array; and communicating with the second network node via the selected two of the first array, the second array, and the third array.

Aspect 16: The method of aspect 15, further comprising: selecting, based on the set of reference signals, an antenna element configuration of the antenna elements of the selected two of the first array, the second array, and the third array.

Aspect 17: The method of any of aspects 14 through 16, wherein transmitting the first control information comprises: transmitting the first control information including an indication that the type of the antenna module includes the third array of antenna elements in the third dimension that is different than the first dimension and the second dimension and an indication that the first network node is capable of dynamically selecting two of the first array, the second array, and the third array.

Aspect 18: The method of any of aspects 14 through 17, wherein the third dimension is perpendicular to the first dimension and the second dimension.

Aspect 19: A method for wireless communications at a first network node, comprising: receiving, from a second network node, first control information including an indication of a type of an antenna module of the second network node, wherein the type of the antenna module includes a set of antenna elements of the second network node arranged in a first array of antenna elements in a first dimension and a second array of antenna elements in a second dimension that is different than the first dimension; transmitting, to the second network node, scheduling information for a set of reference signals based on the type of the antenna module; transmitting, to the second network node, the set of reference signals in accordance with the scheduling information; and receiving, from the second network node, second control information based on measurement information associated with the type of the antenna module at the second network node for the set of reference signals.

Aspect 20: The method of aspect 19, wherein the second control information comprises an indication of a first antenna element configuration for the set of antenna elements.

Aspect 21: The method of aspect 20, further comprising: transmitting, to the second network node, an indication of a transmission configuration indicator (TCI) state based on the indication of the first antenna element configuration.

Aspect 22: The method of any of aspects 20 through 21, further comprising: transmitting, to the second network node, third control information including an indication of an association between each antenna element configuration of a plurality of antenna element configurations and a respective TCI state, wherein the plurality of antenna element configurations comprises the first antenna element configuration, and wherein the indication of the first antenna element configuration comprises an indication of the respective TCI state associated with the first antenna element configuration.

Aspect 23: The method of any of aspects 19 through 22, wherein the second control information includes an indication of respective RSRP measurements associated with a plurality of antenna element configurations for the set of antenna elements.

Aspect 24: The method of aspect 23, further comprising: transmitting, to the second network node, an indication of a transmission configuration indicator (TCI) state based on the second control information.

Aspect 25: The method of any of aspects 19 through 24, further comprising: receiving, from the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, wherein each antenna element of the set of antenna elements is associated with a first polarization layer and a second polarization layer, and wherein transmission of the set of reference signals is in response to the third control information.

Aspect 26: The method of aspect 25, wherein the set of reference signals comprises a single reference signal, and the second control information includes an indication of one or the co-polarization configuration or the cross-polarization configuration.

Aspect 27: The method of any of aspects 25 through 26, wherein the set of reference signals comprises a first reference signal and a second reference signal, and the second control information includes an indication of one or the co-polarization configuration or the cross-polarization configuration.

Aspect 28: The method of any of aspects 19 through 27, wherein the first control information further indicates that the first dimension is perpendicular to the second dimension.

Aspect 29: The method of any of aspects 19 through 28, wherein receiving the first control information comprises: receiving the first control information including an indication that the type of the antenna module includes a third array of antenna elements in a third dimension that is different than the first dimension and the second dimension and an indication that the first network node is capable of dynamically selecting two of the first array, the second array, and the third array.

Aspect 30: A first network node for wireless communication, comprising: a processing system configured to perform a method of any of aspects 1 through 18.

Aspect 31: An apparatus for wireless communications at a first network node, comprising at least one means for performing a method of any of aspects 1 through 18.

Aspect 32: A non-transitory computer-readable medium having code for wireless communication stored thereon that, when executed by a network node, causes the network node to perform a method of any of aspects 1 through 18.

Aspect 33: A first network node for wireless communication, comprising: a processing system configured to perform a method of any of aspects 19 through 29.

Aspect 34: An apparatus for wireless communications at a first network node, comprising at least one means for performing a method of any of aspects 19 through 29.

Aspect 35: A non-transitory computer-readable medium having code for wireless communication stored thereon that, when executed by a network node, causes the network node to perform a method of any of aspects 19 through 29.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:

a memory; and at least one processor coupled to the memory, wherein the at least one processor is configured to:

transmit, to a second network node, first control information including an indication of a type of an antenna module of the first network node, wherein the type of the antenna module includes a set of antenna elements arranged in a first array of antenna elements in a first dimension and a second array of antenna elements in a second dimension that is different than the first dimension;

receive, from the second network node, scheduling information for a set of reference signals based on the type of the antenna module;

receive, via the set of antenna elements, the set of reference signals in accordance with the scheduling information;

generate, based on the set of reference signals, measurement information corresponding to a plurality of antenna element configurations for the set of antenna elements;

determine, based on the measurement information, a first antenna element configuration of the plurality of antenna element configurations;

transmit, to the second network node, second control information based on the measurement information, wherein the second control information comprises an indication of the first antenna element configuration; and receive, from the second network node, third control information including an indication of an association between each antenna element configuration and a respective transmission configuration indicator (TCI) state, and wherein the indication of the first antenna element configuration comprises an indication of the respective TCI state associated with the first antenna element configuration.

2. The first network node of claim 1, wherein to generate the measurement information, the at least one processor is configured to:

determine a respective signal strength measurement for each antenna element configuration of the plurality of antenna element configurations, wherein each of the plurality of antenna element configurations is associated with a same power consumption level.

3. The first network node of claim 1, wherein to generate the measurement information, the at least one processor is configured to:

determine a respective reference signal received power measurement for each antenna element configuration of the plurality of antenna element configurations, wherein the second control information includes an indication of the respective reference signal received power measurements.

4. The first network node of claim 1, wherein the first dimension is perpendicular to the second dimension.

5. A first network node for wireless communication, comprising:

a memory; and at least one processor coupled to the memory, wherein the at least one processor is configured to:

transmit, to a second network node, first control information including an indication of a type of an antenna module of the first network node, wherein the type of the antenna module includes a set of antenna elements arranged in a first array of antenna elements in a first dimension and a second array of antenna elements in a second dimension that is different than the first dimension;

receive, from the second network node, scheduling information for a set of reference signals based on the type of the antenna module;

receive, via the set of antenna elements, the set of reference signals in accordance with the scheduling information;

generate, based on the set of reference signals, measurement information corresponding to a plurality of antenna element configurations for the set of antenna elements; and transmit, to the second network node, second control information based on the measurement information, wherein each antenna element of the set of antenna elements is associated with a first polarization layer and a second polarization layer, wherein at least one antenna element configuration of the plurality of antenna element configurations comprises a cross-polarization configuration between antenna elements of the first array and antenna elements of the second array, and wherein at least one antenna element configuration of the plurality of antenna element configurations comprises a co-polarization configuration between antenna elements of the first array and antenna elements of the second array.

6. A first network node for wireless communication, comprising:

a memory; and at least one processor coupled to the memory, wherein the at least one processor is configured to:

transmit, to a second network node, first control information including an indication of a type of an antenna module of the first network node, wherein the type of the antenna module includes a set of antenna elements arranged in a first array of antenna elements in a first dimension and a second array of antenna elements in a second dimension that is different than the first dimension;

receive, from the second network node, scheduling information for a set of reference signals based on the type of the antenna module;

receive, via the set of antenna elements, the set of reference signals in accordance with the scheduling information;

generate, based on the set of reference signals, measurement information corresponding to a plurality of antenna element configurations for the set of antenna elements;

transmit, to the second network node, second control information based on the measurement information; and transmit, to the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, wherein each antenna element of the set of antenna elements is associated with a first polarization layer and a second polarization layer, wherein reception of the set of reference signals is in response to the third control information.

7. The first network node of claim 6, wherein the set of reference signals comprises a single reference signal, wherein to generate the measurement information, the at least one processor is configured to:

determine whether a signal strength measurement for the single reference signal for one of the cross-polarization configuration or the co-polarization configuration satisfies a threshold.

8. The first network node of claim 6, wherein the set of reference signals comprises a first reference signal and a second reference signal, wherein to generate the measurement information, the at least one processor is configured to:

generate a first reference signal received power measurement for the first reference signal for the cross-polarization configuration; and generate a second reference signal received power measurement for the second reference signal for the co-polarization configuration.

9. The first network node of claim 6, wherein the at least one processor is configured to:

receive, from the second network node, fourth control information including an indication to dynamically switch between the co-polarization configuration and the cross-polarization configuration based on the second control information.

10. A first network node for wireless communication, comprising:

a memory; and at least one processor coupled to the memory, wherein the at least one processor is configured to:

transmit, to a second network node, first control information including an indication of a type of an antenna module of the first network node, wherein the type of the antenna module includes a set of antenna elements arranged in a first array of antenna elements in a first dimension and a second array of antenna elements in a second dimension that is different than the first dimension, wherein the antenna module includes a third array of antenna elements in a third dimension that is different than the first dimension and the second dimension, and wherein the first control information includes an indication that the type of the antenna module includes the third array of antenna elements in the third dimension that is different than the first dimension and the second dimension and an indication that the first network node is capable of dynamically selecting two of the first array, the second array, and the third array;

receive, from the second network node, scheduling information for a set of reference signals based on the type of the antenna module;

receive, via the set of antenna elements, the set of reference signals in accordance with the scheduling information;

generate, based on the set of reference signals, measurement information corresponding to a plurality of antenna element configurations for the set of antenna elements; and transmit, to the second network node, second control information based on the measurement information.

11. The first network node of claim 10, wherein the at least one processor is configured to:

select, based on the set of reference signals, two of the first array, the second array, and the third array; and communicate with the second network node via the selected two of the first array, the second array, and the third array.

12. The first network node of claim 11, wherein the at least one processor is configured to:

select, based on the set of reference signals, an antenna element configuration of the antenna elements of the selected two of the first array, the second array, and the third array.

13. The first network node of claim 11, wherein the third dimension is perpendicular to the first dimension and the second dimension.

14. A first network node for wireless communication, comprising:

a memory; and at least one processor coupled to the memory, wherein the at least one processor is configured to:

receive, from a second network node, first control information including an indication of a type of an antenna module of the second network node, wherein the type of the antenna module includes a set of antenna elements of the second network node are arranged in a first array of antenna elements in a first dimension and a second array of antenna elements in a second dimension that is different than the first dimension;

transmit, to the second network node, scheduling information for a set of reference signals based on the type of the antenna module;

transmit, to the second network node, the set of reference signals in accordance with the scheduling information;

receive, from the second network node, second control information based on measurement information associated with the type of the antenna module at the second network node for the set of reference signals, wherein the second control information comprises an indication of a first antenna element configuration for the set of antenna elements; and transmit, to the first network node, third control information including an indication of an association between each antenna element configuration of a plurality of antenna element configurations and a respective transmission configuration indicator (TCI) state, wherein the plurality of antenna element configurations comprises the first antenna element configuration, and wherein the indication of the first antenna element configuration comprises an indication of the respective TCI state associated with the first antenna element configuration.

15. The first network node of claim 14, wherein the second control information includes an indication of respective reference signal received power measurements associated with a plurality of antenna element configurations for the set of antenna elements.

16. A first network node for wireless communication, comprising:

a memory; and at least one processor coupled to the memory, wherein the at least one processor is configured to:

receive, from a second network node, first control information including an indication of a type of an antenna module of the second network node, wherein the type of the antenna module includes a set of antenna elements of the second network node are arranged in a first array of antenna elements in a first dimension and a second array of antenna elements in a second dimension that is different than the first dimension;

transmit, to the second network node, scheduling information for a set of reference signals based on the type of the antenna module;

transmit, to the second network node, the set of reference signals in accordance with the scheduling information;

receive, from the second network node, second control information based on measurement information associated with the type of the antenna module at the second network node for the set of reference signals; and receive, from the second network node, third control information including an indication of a capability of the first network node to dynamically switch between a co-polarization configuration between antenna elements of the first array and antenna elements of the second array and a cross-polarization configuration between antenna elements of the first array and antenna elements of the second array, wherein each antenna element of the set of antenna elements is associated with a first polarization layer and a second polarization layer, and wherein transmission of the set of reference signals is in response to the third control information.

17. The first network node of claim 16, wherein the set of reference signals comprises a single reference signal, and wherein the second control information includes an indication of one or the co-polarization configuration or the cross-polarization configuration.

18. The first network node of claim 16, wherein the set of reference signals comprises a first reference signal and a second reference signal, and wherein the second control information includes an indication of one or the co-polarization configuration or the cross-polarization configuration.

19. A first network node for wireless communication, comprising:

a memory; and at least one processor coupled to the memory, wherein the at least one processor is configured to:

receive, from a second network node, first control information including an indication of a type of an antenna module of the second network node, wherein the type of the antenna module includes a set of antenna elements of the second network node are arranged in a first array of antenna elements in a first dimension and a second array of antenna elements in a second dimension that is different than the first dimension;

transmit, to the second network node, scheduling information for a set of reference signals based on the type of the antenna module;

transmit, to the second network node, the set of reference signals in accordance with the scheduling information;

receive, from the second network node, second control information based on measurement information associated with the type of the antenna module at the second network node for the set of reference signals; and receive the first control information including an indication that the type of the antenna module includes a third array of antenna elements in a third dimension that is different than the first dimension and the second dimension and an indication that the first network node is capable of dynamically selecting two of the first array, the second array, and the third array.

* * * * *